United States Patent
Lampe-Onnerud et al.

(10) Patent No.: US 10,637,022 B2
(45) Date of Patent: *Apr. 28, 2020

(54) LITHIUM ION BATTERY

(71) Applicant: Cadenza Innovation, Inc., Wilton, CT (US)

(72) Inventors: Maria Christina Lampe-Onnerud, Wilton, CT (US); Tord Per Jens Onnerud, Wilton, CT (US); Jay Jie Shi, Acton, MA (US); Michael Suba, Sandy Hook, CT (US); Joshua Liposky, Seymour, CT (US)

(73) Assignee: Cadenza Innovation, Inc., Wilton, CT (US)

(*) Notice: Subject to any disclaimer, the term of this patent is extended or adjusted under 35 U.S.C. 154(b) by 219 days.

This patent is subject to a terminal disclaimer.

(21) Appl. No.: 15/840,162

(22) Filed: Dec. 13, 2017

(65) Prior Publication Data

US 2018/0145292 A1    May 24, 2018

Related U.S. Application Data

(63) Continuation-in-part of application No. 15/616,438, filed on Jun. 7, 2017, now Pat. No. 9,871,236, which
(Continued)

(51) Int. Cl.
*H01M 2/10* (2006.01)
*H01M 10/0525* (2010.01)
(Continued)

(52) U.S. Cl.
CPC ....... *H01M 2/1077* (2013.01); *H01M 2/0242* (2013.01); *H01M 2/1094* (2013.01);
(Continued)

(58) Field of Classification Search
CPC ............. H01M 2/1016; H01M 2/1027; H01M 2/1077; H01M 2/1094; H01M 2/0242;
(Continued)

(56) References Cited

U.S. PATENT DOCUMENTS

| | | | |
|---|---|---|---|
| 4,346,151 A | 8/1982 | Uba et al. | |
| 4,521,498 A | 6/1985 | Juergens | |

(Continued)

FOREIGN PATENT DOCUMENTS

| | | |
|---|---|---|
| CN | 1964126 | 5/2007 |
| DE | 102007063194 | 6/2009 |

(Continued)

OTHER PUBLICATIONS

PCT International Search Report and Written Opinion for PCT/US2013/064654 dated Jul. 13, 2015.
(Continued)

*Primary Examiner* — Gregg Cantelmo
(74) *Attorney, Agent, or Firm* — McCarter & English, LLP

(57) ABSTRACT

A multi-core lithium ion battery includes a sealed enclosure and a support member disposed within the sealed enclosure. The sealed enclosure may further include at least two support members housed within individual compartments, separated by shared wall(s). The support member(s) includes a plurality of cavities and a plurality of lithium ion core members which are disposed within the plurality of cavities. The battery may further include a plurality of cavity liners, each of which is positioned between a corresponding one of the lithium ion core members and a surface of a corresponding one of the cavities. The hermetically sealed enclosure may be formed using a clamshell configuration.
(Continued)

Structures may be included in proximity to or in contact with the lithium ion core members to control gas/fluid flow therefrom.

24 Claims, 11 Drawing Sheets

Related U.S. Application Data is a continuation of application No. 14/434,848, filed as application No. PCT/US2013/064654 on Oct. 11, 2013, now Pat. No. 9,685,644.

(60) Provisional application No. 61/795,150, filed on Oct. 11, 2012.

(51) Int. Cl.
| | | |
|---|---|---|
| *H01M 2/34* | (2006.01) | |
| *H01M 2/02* | (2006.01) | |
| *H01M 2/16* | (2006.01) | |
| *H01M 4/36* | (2006.01) | |
| *H01M 4/485* | (2010.01) | |
| *H01M 4/505* | (2010.01) | |
| *H01M 4/525* | (2010.01) | |
| *H01M 4/58* | (2010.01) | |
| *H01M 10/0567* | (2010.01) | |
| *H01M 16/00* | (2006.01) | |
| *H01M 10/42* | (2006.01) | |

(52) U.S. Cl.
CPC ............ *H01M 2/34* (2013.01); *H01M 2/347* (2013.01); *H01M 10/0525* (2013.01); *H01M 2/1016* (2013.01); *H01M 2/1027* (2013.01); *H01M 2/1686* (2013.01); *H01M 4/366* (2013.01); *H01M 4/485* (2013.01); *H01M 4/505* (2013.01); *H01M 4/525* (2013.01); *H01M 4/5825* (2013.01); *H01M 10/0567* (2013.01); *H01M 16/00* (2013.01); *H01M 2010/4271* (2013.01); *H01M 2200/00* (2013.01); *H01M 2200/103* (2013.01); *H01M 2220/10* (2013.01); *H01M 2220/20* (2013.01); *Y02E 60/122* (2013.01); *Y02T 10/7011* (2013.01)

(58) Field of Classification Search
CPC ...... H01M 2/34; H01M 2/347; H01M 2/1686; H01M 2/206; H01M 4/366; H01M 4/485; H01M 4/505; H01M 4/525; H01M 4/5825; H01M 10/0525; H01M 10/0567; H01M 16/00; H01M 2010/4271; H01M 2200/00; H01M 2200/103; H01M 2220/10; H01M 2220/20; Y02T 10/7011
See application file for complete search history.

(56) References Cited

U.S. PATENT DOCUMENTS

| | | | |
|---|---|---|---|
| 5,198,473 A | 3/1993 | Gallagher et al. | |
| 5,609,972 A | 3/1997 | Kaschmitter et al. | |
| 5,741,606 A | 4/1998 | Mayer et al. | |
| 6,255,015 B1 | 7/2001 | Corrigan et al. | |
| 6,524,741 B1 | 2/2003 | Bryan | |
| 6,586,912 B1 | 7/2003 | Tsukamoto et al. | |
| 6,653,017 B2 | 11/2003 | Satoh et al. | |
| 6,746,795 B2 | 6/2004 | Schwarz | |
| 7,141,332 B2 | 11/2006 | Kejha et al. | |
| 7,186,477 B2 | 3/2007 | Lei | |
| 7,358,009 B2 | 4/2008 | Johnson et al. | |
| 7,547,487 B1 | 6/2009 | Smith et al. | |
| 7,709,143 B2 | 5/2010 | Lee | |
| 7,820,319 B2 | 10/2010 | Mehta et al. | |
| 8,088,509 B2 | 1/2012 | Shen et al. | |
| 8,119,274 B2 | 2/2012 | Park et al. | |
| 8,323,826 B2 | 12/2012 | Okada | |
| 8,475,953 B2 | 7/2013 | Chew et al. | |
| 8,524,392 B2 | 9/2013 | Yongin-si | |
| 8,541,126 B2* | 9/2013 | Hermann | H01M 2/1016 429/120 |
| 8,546,007 B2 | 10/2013 | Lee et al. | |
| 8,568,916 B2 | 10/2013 | Nakai et al. | |
| 8,785,026 B2 | 7/2014 | Hu et al. | |
| 9,012,062 B2 | 4/2015 | Smith et al. | |
| 9,685,644 B2 | 6/2017 | Lampe-Onnerud et al. | |
| 9,871,236 B2 | 1/2018 | Lampe-Onnerud et al. | |
| 9,905,821 B2 | 2/2018 | Eberhard et al. | |
| 2002/0012833 A1 | 1/2002 | Gow | |
| 2002/0155348 A1 | 10/2002 | Smith et al. | |
| 2003/0059670 A1 | 3/2003 | Bechtold | |
| 2003/0205987 A1 | 11/2003 | Barley | |
| 2004/0253397 A1 | 12/2004 | Hayes | |
| 2008/0020270 A1 | 1/2008 | Park et al. | |
| 2008/0206628 A1 | 8/2008 | Honbou | |
| 2009/0029253 A1 | 1/2009 | Itou | |
| 2009/0246640 A1 | 10/2009 | Bak | |
| 2009/0325041 A1 | 12/2009 | Okumura et al. | |
| 2010/0055556 A1 | 3/2010 | Meschter | |
| 2010/0143773 A1 | 6/2010 | Honbou | |
| 2010/0190081 A1 | 7/2010 | Hey Woong et al. | |
| 2010/0255359 A1 | 10/2010 | Osaka et al. | |
| 2010/0310911 A1 | 12/2010 | Yamamoto et al. | |
| 2011/0027641 A1 | 2/2011 | Rejman | |
| 2011/0177366 A1 | 7/2011 | Nagasaki et al. | |
| 2011/0236741 A1 | 9/2011 | Chew et al. | |
| 2012/0003508 A1 | 1/2012 | Narbonne et al. | |
| 2012/0003523 A1 | 1/2012 | Schaller et al. | |
| 2012/0114981 A1 | 5/2012 | Cho et al. | |
| 2012/0125447 A1 | 5/2012 | Fuhr et al. | |
| 2013/0040178 A1 | 2/2013 | Lim | |
| 2013/0177138 A1 | 11/2013 | Gardner | |
| 2013/0327312 A1 | 12/2013 | Coffey et al. | |
| 2015/0064514 A1* | 3/2015 | Wu | H01M 2/1241 429/56 |
| 2015/0295221 A1 | 10/2015 | Urano et al. | |
| 2016/0380243 A1 | 12/2016 | Kim | |

FOREIGN PATENT DOCUMENTS

| | | |
|---|---|---|
| EP | 1835251 | 9/2007 |
| EP | 2648242 | 10/2013 |
| JP | 05-275088 | 10/1993 |
| JP | 09082293 | 3/1997 |
| JP | 09-120812 | 5/1997 |
| JP | 10233237 | 9/1998 |
| JP | 2002-100328 | 4/2002 |
| JP | 2012-111752 | 6/2012 |
| JP | 2012-174434 | 9/2012 |
| KR | 10-2009-0112258 | 10/2009 |
| KR | 10-2011-0114459 | 10/2011 |
| WO | 2005/119813 | 12/2005 |
| WO | 2007/053990 | 5/2007 |
| WO | 2009/141348 | 8/2007 |
| WO | 2007/145441 | 12/2007 |
| WO | 2012/073438 | 6/2012 |
| WO | 2014/059348 | 4/2014 |
| WO | 2015/179625 | 5/2015 |
| WO | 2017/106349 | 6/2017 |

OTHER PUBLICATIONS

PCT International Search Report and Written Opinion for PCT/US2015/031948 dated Oct. 23, 2015.
European Patent Office Action with search results on European Patent Application No. EP 13785696 dated Nov. 11, 2016.
U.S. Appl. No. 61/795,150, filed Oct. 11, 2012.
U.S. Appl. No. 61/997,082, filed May 21, 2014.
U.S. Appl. No. 62/107,630, filed Jan. 26, 2015.
U.S. Appl. No. 62/107,845, filed Jan. 26, 2015.

(56) References Cited

OTHER PUBLICATIONS

PCT International Search Report and Written Opinion for PCT/US2016/066663 dated May 10, 2017.
U.S. Appl. No. 15/616,438, filed Jun. 7, 2017, U.S. Pat. No. 9,871,236.
U.S. Appl. No. 15/562,792, filed Sep. 28, 2017.
U.S. Appl. No. 62/561,927, filed Sep. 22, 2017.
U.S. Appl. No. 62/266,813, filed Dec. 14, 2016.
U.S. Appl. No. 62/395,050, filed Sep. 15, 2016.
PCT/US2016/066663, Dec. 14, 2015, WO 2017/106349.
U.S. Appl. No. 14/434,848, filed Apr. 10, 2015, U.S. Pat. No. 9,685,644.
PCT/US2013/064654, Oct. 11, 2013, WO 2014/059348 A2.

* cited by examiner

| # of Cells | 7 | 8 | 9 | 9 (dual size) | | 10 | 11 (straight) | 11 (staggered) | 11 (dual size) | |
|---|---|---|---|---|---|---|---|---|---|---|
| Bore Dia (Mm) | 22.79 | 22.14 | 21.2 | 21.2 | 21.8 | 20.4 | 18.4 | 18.22 | 17.4 | 21.2 |
| Jelly Roll Dia (mm) | 21.39 | 20.74 | 19.8 | 5 @19.8 | 4 @ 20.4 | 19 | 16 | 16.82 | 6 @ 16 | 5 @ 19.8 |
| Capacity (Ah) | 84.46 | 90.41 | 92.11 | 51.17+43.63=94.8 | | 93.66 | 70.6 | 78.95 | 38.53+51.17=89.7 | |

Preferred: 9, 10

FIG. 2

LITHIUM ION BATTERY

CROSS-REFERENCE TO RELATED APPLICATIONS

This application is a continuation-in-part application that claims priority benefit to a non-provisional patent application entitled "Lithium Ion Battery," which was filed on Jun. 7, 2017, and assigned Ser. No. 15/616,438,and issued on Jan. 16, 2018 as U.S Pat No. 9,871,236. The foregoing non-provisional patent application was a continuation application that claims priority benefit to a non-provisional patent application entitled "Lithium Ion Battery," which was filed on Apr. 10, 2015, and assigned Ser. No. 14/434,848, and issued on Jun. 20, 2017 as U.S. Pat. No. 9,685,644, which was a national application filed under Rule 371 based on and claiming priority benefit to PCT/US 2013/064,654 which was filed on Oct. 11, 2013, and which claimed priority benefit to a provisional patent application filed on Oct. 11, 2012, and assigned Ser. No. 61/795,150. Each of the noted patent applications is incorporated herein by reference in its entirety.

The present application is also related to the following disclosures: (i) U.S. non-provisional patent application entitled "Low Profile Pressure Disconnect Device for Lithium Ion Batteries," which was filed on Sep. 28, 2017, and assigned Ser. No. 15/562,792; (ii) PCT application entitled "Low Profile Pressure Disconnect Device for Lithium Ion Batteries," which was filed on Dec. 14, 2015, and assigned Serial No. PCT/US16/066663 (republished as WO 2017/106349 on Jun. 22, 2017); (iii) U.S. provisional patent application entitled "Lithium Ion Battery with Modular Bus Bar Assemblies," which was filed on Sep. 22, 2017, and assigned Ser. No. 62/561,927; (iv) U.S. provisional patent application entitled "Current Interrupt and Vent Systems for Lithium Ion Batteries," which was filed on Dec. 14, 2016, and assigned Ser. No. 62/266,813; and (v) U.S. provisional patent application entitled "Current Vent/Pressure Disconnect Device System for Lithium Ion Batteries," which was filed on Sep. 15, 2016, and assigned Ser. No. 62/395,050. The entire contents of the foregoing patent applications are incorporated herein by reference.

STATEMENT REGARDING FEDERALLY SPONSORED RESEARCH

This invention was made with government support under DE-AR0000392 awarded by the United States Department of Energy. The government has certain rights in the invention.

FIELD OF DISCLOSURE

This invention relates to lithium ion batteries and more particularly to multi-core lithium ion batteries having improved safety and reduced manufacturing costs.

BACKGROUND

The demand for electro-chemical power cells, such as Lithium-ion batteries, is ever increasing due to the growth of applications such as electric vehicles and grid storage systems, as well as other multi-cell battery applications, such as electric bikes, uninterrupted power battery systems, and lead acid replacement batteries. It is a requirement for these applications that the energy and power densities are high, but just as important, if not more, are the requirements of low cost manufacturing and increased safety to enable broad commercial adoption. There is further a need to tailor the energy to power ratios of these batteries to that of the application.

For grid storage and electric vehicles, which are large format applications multiple cells connected in series and parallel arrays are required. Suppliers of cells are focused either on large cells, herein defined as more than 10 Ah (Ampere hours) for each single cell, or small cells, herein defined as less than 10 Ah. Large cells, such as prismatic or polymer cells, which contain stacked or laminated electrodes, are made by LG Chemical, AESC, ATL and other vendors. Small cells, such as 18650 or 26650 cylindrical cells, or prismatic cells such as 183765 or 103450 cells and other similar sizes are made by Sanyo, Panasonic, EoneMoli, Boston-Power, Johnson Controls, Saft, BYD, Gold Peak, and others. These small cells often utilize a jelly roll structure of oblong or cylindrical shape. Some small cells are polymer cells with stacked electrodes, similar to large cells, but of less capacity.

Existing small and large cell batteries have some significant drawbacks. With regard to small cells, such as 18650 cells, they have the disadvantage of typically being constrained by a an enclosure or a 'can', which causes limitations for cycle life and calendar life, due in part to mechanical stress or electrolyte starvation. As lithium ion batteries are charged, the electrodes expand. Because of the can, the jelly roll structures of the electrodes are constrained and mechanical stress occurs in the jelly roll structure, which limits its life cycle. As more and more storage capacity is desired, more active anode and cathode materials are being inserted into a can of a given volume which results in further mechanical stresses on the electrode.

Also the ability to increase the amount of electrolyte in small cells is limited and as the lithium intercalates and de-intercalates, the electrode movement squeezes out the electrolyte from the jelly roll. This causes the electrode to become electrolyte starved, resulting in concentration gradients of lithium ions during power drain, as well as dry-out of the electrodes, causing side reactions and dry regions that block the ion path degrading battery life. To overcome these issues, especially for long life batteries, users have to compromise performance by lowering the state of charge, limiting the available capacity of the cells, or lowering the charge rate.

On the mechanical side, small cells are difficult and costly to assemble into large arrays. Complex welding patterns have to be created to minimize the potential for weld failures. Weld failures result in lowered capacity and potential heating at failed weld connections. The more cells in the array the higher the failure risk and the lower manufacturing yields. This translates into higher product and warranty costs. There are also potential safety issues associated not only by failure issues in welds and internal shorts, but also in packaging of small cells. Proper packaging of small cells is required to avoid cascading thermal runaway as a result of a failure of one cell. Such packaging results in increased costs.

For large cells, the disadvantages are primarily around safety, low volumetric and gravimetric capacity, and costly manufacturing methods. Large cells having large area electrodes suffer from low manufacturing yields compared to smaller cells. If there is a defect on a large cell electrode more material is wasted and overall yields are low compared to the manufacturing of a small cell. Take for instance a 50 Ah cell compared to a 5 Ah cell. A defect in the 50 Ah cell results in 10× material loss compared to the 5 Ah cell, even if a defect for both methods of production only occurs every 50 Ah of produced cells Another issue for large cells is safety. The energy released in a cell going into thermal runaway is proportional to the amount of electrolyte that resides inside the cell and accessible during a thermal runaway scenario. The larger the cell, the more free space is available for the electrolyte in order to fully saturate the electrode structure. Since the amount of electrolyte per Wh for a large cell typically is greater than a small cell, the large cell battery in general is a more potent system during thermal runaway and therefore less safe. Naturally any thermal runaway will depend on the specific scenario but, in general, the more fuel (electrolyte) the more intense the fire in the case of a catastrophic event. In addition, once a large cell is in thermal runaway mode, the heat produced by the cell can induce a thermal runaway reaction in adjacent cells causing a cascading effect igniting the entire pack with massive destruction to the pack and surrounding equipment and unsafe conditions for users.

When comparing performance parameters of small and large cells relative to each other, it can be found that small cells in general have higher gravimetric (Wh/kg) and volumetric (Wh/L) capacity compared to large cells. It is easier to group multiples of small cells using binning techniques for capacity and impedance and thereby matching the entire distribution of a production run in a more efficient way, compared to large cells. This results in higher manufacturing yields during battery pack mass production, in addition, it is easier to arrange small cells in volumetrically efficient arrays that limit cascading runaway reactions of a battery pack, ignited by for instance an internal short in one cell (one of the most common issue in the field for safety issues). Further, there is a cost advantage of using small cells as production methods are well established at high yield by the industry and failure rates are low. Machinery is readily available and cost has been driven out of the manufacturing system.

On the other hand, the advantage of large cells is the ease of assembly for battery pack OEMs, which can experience a more robust large format structure which often has room for common electromechanical connectors that are easier to use and the apparent fewer cells that enables effective pack manufacturing without having to address the multiple issues and know-how that is required to assemble an array of small cells.

In order to take advantage of the benefits of using small cells to create batteries of a larger size and higher power/energy capability, but with better safety and lower manufacturing costs, as compared to large cells, assemblies of small cells in a multi-core (MC) cell structure have been developed.

One such MC cell structure, developed by BYD Company Ltd., uses an array of MC's integrated into one container made of metal (Aluminum, copper alloy or nickel chromium). This array is described in the following documents: EP 1952475 AO; WO2007/053990; US2009/0142658 A1; CN 1964126A. The BYD structure has only metallic material surrounding the MCs and therefore has the disadvantage during mechanical impact of having sharp objects penetrate into a core and cause a localized short. Since all the cores are in a common container (not in individual cans) where electrolyte is shared among cores, propagation of any individual failure, from manufacturing defects or external abuse, to the other cores and destruction of the MC structure is likely. Such a cell is unsafe.

Methods for preventing thermal runaway in assemblies of multiple electrochemical cells have been described in US2012/0003508 A1. In the MC structure described in this patent application, individual cells are connected in parallel or series, each cell having a jelly roll structure contained within its own can. These individual cells are then inserted into a container which is filled with rigid foam, including fire retardant additives. These safety measures are costly to produce and limit energy density, partly due to the excessive costs of the mitigating materials.

Another MC structure is described in patent applications US2010/0190081 A1 and WO2007/145441 A1, which discloses the use of two or more stacked-type secondary batteries with a plurality of cells that provide two or more voltages by a single battery. In this arrangement single cells are connected in series within an enclosure and use of a separator. The serial elements only create a cell of higher voltage, but do not solve any safety or cost issues compared to a regularly stacked-type single voltage cell.

These MC type batteries provide certain advantages over large cell batteries; however, they still have certain shortcomings in safety and cost.

SUMMARY

The present disclosure provides a novel type MC lithium ion battery structure, having reduced production costs and improved safety while providing the benefits of a larger size battery, such as ease of assembly of arrays of such batteries and an ability to tailor power to energy ratios.

A multi-core lithium ion battery is described having a sealed enclosure with a support member disposed within the sealed enclosure. The support member including a plurality of cavities and a plurality of lithium ion core members, disposed within a corresponding one of the plurality of cavities. There are a plurality of cavity liners, each positioned between a corresponding one of the lithium ion core members and a surface of a corresponding one of the cavities. The support member includes a kinetic energy absorbing material and the kinetic energy absorbing material is formed of one of aluminum foam, ceramic, and plastic. The cavity liners are formed of a plastic material and the plurality of cavity liners are formed as part of a monolithic liner member. There is further included an electrolyte contained within each of the cores and the electrolyte includes at least one of a flame retardant, a gas generating agent, and a redox shuttle. Each lithium ion core member includes an anode, a cathode and a separator disposed between each anode and cathode. There is further included an electrical connector within said enclosure electrically connecting said core members to an electrical terminal external to the sealed enclosure. The electrical connector includes two bus bars, the first bus bar interconnecting the anodes of said core members to a negative terminal member of the terminal external to the enclosure, the second bus bar interconnecting the cathodes of said core members to a positive terminal member of the terminal external to the enclosure.

In another aspect of the disclosure, a compartmentalized enclosure for a lithium ion battery is provided that includes at least two support members, that house lithium ion core members, in parallel and/or series. Exemplary lithium ion core members for inclusion in the disclosed support members take the form of jelly rolls with a cylindrical (or substantially cylindrical) shape. The compartmentalized enclosure further includes at least one shared wall that functions to separate first and second compartments from each other. The first/second compartments may define a shared atmosphere across the two compartments, or the shared wall may function to define distinct/individual atmosphere in the respective compartments, i.e., the shared wall functions to define a first hermetically sealed region in the first compartment, and a second hermetically sealed region in the second compartment.

In implementations of the present disclosure wherein the shared wall of the compartmentalized enclosure defines a shared atmosphere across first/second compartments, the disclosed compartmentalized enclosure may advantageously include at least one pressure disconnect device/feature in communication with the shared atmosphere. Thus, in exemplary embodiments, a single pressure disconnect device/feature may be provided that is effective in providing pressure disconnect functionality for both first and second compartments.

In implementation of the present disclosure wherein the shared wall of the compartmentalized enclosure defines distinct first/second compartments, multiple pressure disconnect devices/feature may be advantageously provided, i.e., a first pressure disconnect device/feature for the first compartment and a second pressure disconnect device/feature for the second compartment.

In another aspect of the disclosure, the core members are connected in parallel or they are connected in series. Alternatively, a first set of core members are connected in parallel and a second set of core members are connected in parallel, and the first set of core members is connected in series with the second set of core members. The support member is in the form of a honeycomb structure. The kinetic energy absorbing material includes compressible media. The enclosure includes a wall having a compressible element which when compressed due to a force impacting the wall creates an electrical short circuit of the lithium ion battery. The cavities in the support member and their corresponding core members are one of cylindrical, oblong, and prismatic in shape. The at least one of the cavities and its corresponding core member have different shapes than the other cavities and their corresponding core members.

In another aspect of the disclosure, the at least one of the core members has high power characteristics and at least one of the core members has high energy characteristics. The anodes of the core members are formed of the same material and the cathodes of the core members are formed of the same material. Each separator member includes a ceramic coating and each anode and each cathode includes a ceramic coating. At least one of the core members includes one of an anode and cathode of a different thickness than the thickness of the anodes and cathodes of the other core members. At least one cathode includes at least two out of the Compound A through M group of materials. Each cathode includes a surface modifier. Each anode includes Li metal or one of carbon or graphite. Each anode includes Si. Each core member includes a rolled anode, cathode and separator structure or each core member includes a stacked anode, cathode and separator structure.

In another aspect of this disclosure, the core members have substantially the same electrical capacity. At least one of the core members has a different electrical capacity than the other core members. At least one of the core members is optimized for power storage and at least one of the core members is optimized for energy storage. There is further included a tab for electrically connecting each anode to the first bus bar and a tab for electrically connecting each cathode to the second bus bar, wherein each tab includes a means for interrupting the flow of electrical current through each said tab when a predetermined current has been exceeded. The first bus bar includes a fuse element, proximate each point of interconnection between the anodes to the first bus bar and the second bus bar includes a fuse element proximate each point of interconnection between the cathodes to the second bus bar, for interrupting the flow of electrical current through said fuse elements when a predetermined current has been exceeded. There is further included a protective sleeve surrounding each of the core members and each protective sleeve is disposed outside of the cavity containing its corresponding core member.

In yet another aspect of the disclosure, there are include sensing wires electrically interconnected with said core members configured to enable electrical monitoring and balancing of the core members. The sealed enclosure includes a fire retardant member and the fire retardant member includes a fire retardant mesh material affixed to the exterior of the enclosure.

In another embodiment, there is described a multi-core lithium ion battery comprising a sealed enclosure. A support member is disposed within the sealed enclosure, the support member including a plurality of cavities, wherein the support member includes a kinetic energy absorbing material. There are a plurality of lithium ion core members, disposed within a corresponding one of the plurality of cavities. There is further included a plurality of cavity liners, each positioned between a corresponding one of the lithium ion core members and a surface of a corresponding one of the cavities. The cavity liners are formed of a plastic material and the plurality of cavity liners are formed as part of a monolithic liner member. The kinetic energy absorbing material is formed of one of aluminum foam, ceramic, and plastic.

In another aspect of the disclosure, there is an electrolyte contained within each of the cores and the electrolyte includes at least one of a flame retardant, a gas generating agent, and a redox shuttle. Each lithium ion core member includes an anode, a cathode and separator disposed between each anode and cathode. There is further included an electrical connector within said enclosure electrically connecting said core members to an electrical terminal external to the sealed enclosure. The electrical connector includes two bus bars, the first bus bar interconnecting the anodes of said core members to a negative terminal member of the terminal external to the enclosure, the second bus bar interconnecting the cathodes of said core members to a positive terminal member of the terminal external to the enclosure. The core members are connected in parallel. The core members are connected in series. The lithium ion battery may include a first set of core members that are connected in parallel and a second set of core members that are connected in parallel, and the first set of core members may be connected in series with the second set of core members.

In another aspect, the support member is in the form of a honeycomb structure. The kinetic energy absorbing material includes compressible media. The lithium enclosure includes a wall having a compressible element which when compressed due to a force impacting the wall creates an electrical short circuit of the lithium ion battery. The cavities in the support member and their corresponding core members are one of cylindrical, oblong, and prismatic in shape. At least one of the cavities and its corresponding core member have different shapes than the other cavities and their corresponding core members. At least one of the core members has high power characteristics and at least one of the core members has high energy characteristics. The anodes of the core members are formed of the same material and the cathodes of the core members are formed of the same material. Each separator member includes a ceramic coating. Each anode and each cathode includes a ceramic coating. At least one of the core members includes one of an anode and cathode of a different thickness than the thickness of the anodes and cathodes of the other core members.

In yet another aspect, at least one cathode includes at least two out of the Compound A through M group of materials. Each cathode includes a surface modifier. Each anode includes Li metal, carbon, graphite or Si. Each core member includes a rolled anode, cathode and separator structure. Each core member includes a stacked anode, cathode and separator structure. The core members have substantially the same electrical capacity. Wherein at least one of the core members has a different electrical capacity than the other core members. At least one of the core members is optimized for power storage and at least one of the core members is optimized for energy storage.

In another aspect of the disclosure, there is further included a tab for electrically connecting each anode to the first bus bar and a tab for electrically connecting each cathode to the second bus bar, wherein each tab includes a means for interrupting the flow of electrical current through each said tab when a predetermined current has been exceeded. The first bus bar includes a fuse element, proximate each point of interconnection between the anodes to the first bus bar and a fuse element, proximate each point of interconnection between the cathodes to the second bus bar, for interrupting the flow of electrical current through said fuse elements when a predetermined current has been exceeded. There is further included a protective sleeve surrounding each of the core members and each protective sleeve is disposed outside of the cavity containing its corresponding core member.

In another embodiment of the disclosure, there are sensing wires electrically interconnected with said core members configured to enable electrical monitoring and balancing of the core members. The sealed enclosure includes a fire retardant member and the fire retardant member includes a fire retardant mesh material affixed to the exterior of the enclosure.

In another embodiment, a multi-core lithium ion battery is described which includes a sealed enclosure, with a lithium ion cell region and a shared atmosphere region in the interior of the enclosure. There is a support member disposed within the lithium ion cell region of the sealed enclosure and the support member includes a plurality of cavities, each cavity having an end open to the shared atmosphere region. There are a plurality of lithium ion core members, each having an anode and a cathode, disposed within a corresponding one of the plurality of cavities, wherein said anode and said cathode are exposed to the shared atmosphere region by way of the open end of the cavity and said anode and said cathode are substantially surrounded by said cavity along their lengths. The support member includes a kinetic energy absorbing material. The kinetic energy absorbing material is formed of one of aluminum foam, ceramic and plastic.

In another aspect, there are a plurality of cavity liners, each positioned between a corresponding one of the lithium ion core members and a surface of a corresponding one of the cavities and the cavity liners are formed of a plastic material. The pluralities of cavity liners are formed as part of a monolithic liner member. There is an electrolyte contained within each of the cores and the electrolyte includes at least one of a flame retardant, a gas generating agent, and a redox shuttle. Each lithium ion core member includes an anode, a cathode and separator disposed between each anode and cathode. There is an electrical connector within said enclosure electrically connecting said core members to an electrical terminal external to the sealed enclosure. The electrical connector includes two bus bars, the first bus bar interconnecting the anodes of said core members to a negative terminal member of the terminal external to the enclosure, the second bus bar interconnecting the cathodes of said core members to a positive terminal member of the terminal external to the enclosure.

In yet another aspect, the core members are connected in parallel or the core members are connected in series. Alternatively, a first set of core members are connected in parallel and a second set of core members are connected in parallel, and the first set of core members is connected in series with the second set of core members.

In another embodiment, a lithium ion battery is described and includes a sealed enclosure and at least one lithium ion core member disposed within the sealed enclosure. The lithium ion core member having an anode and a cathode, wherein the cathode includes at least two compounds selected from the group of Compounds A through M. There is only one lithium ion core member. The sealed enclosure is a polymer bag or the sealed enclosure is metal canister. Each cathode includes at least two compounds selected from group of compounds B, C, D, E, F, G L, and M and further including a surface modifier. Each cathode includes at least two compounds selected from group of Compounds B, D, F, G, and L. The battery is charged to a voltage higher than 4.2V. Each anode includes one of carbon and graphite. Each anode includes Si.

In yet another embodiment a lithium ion battery is described having a sealed enclosure and at least one lithium ion core member disposed within the sealed enclosure. The lithium ion core member having an anode and a cathode. An electrical connector within said enclosure electrically connecting said at least one core member to an electrical terminal external to the sealed enclosure; wherein the electrical connector includes a means for interrupting the flow of electrical current through said electrical connector when a predetermined current has been exceeded. The electrical connector includes two bus bars, the first bus bar interconnecting the anodes of said core members to a negative terminal member of the terminal external to the enclosure, the second bus bar interconnecting the cathodes of said core members to a positive terminal member of the terminal external to the enclosure. The electrical connector further includes a tab for electrically connecting each anode to the first bus bar tab for electrically connecting each cathode to the second bus bar, wherein each tab includes a means for interrupting the flow of electrical current through each said tab when a predetermined current has been exceeded. The electrical connector wherein first bus bar includes a fuse element, proximate each point of interconnection between the anodes to the first bus bar and the second bus bar includes a fuse element, proximate each point of interconnection between the cathodes to the second bus bar, for interrupting the flow of electrical current through said fuse elements when a predetermined current has been exceeded.

In another aspect, an enclosure is fabricated using a clamshell configuration wherein symmetrically identical side wall components are attached together along a pair of seams to define the complete enclosure. The clamshell components may be fabricated using plastic or ceramic materials, but may also be made of metal. The clamshell configuration(s) may provide a cost-savings by substantially reducing manufacturing/assembly operations.

In yet another aspect, one or more blanket-like structures may be provided within the disclosed enclosure. The blanket-like structure(s) are generally configured and dimensioned so as to be positionable in proximity to the electrochemical elements, e.g., atop an open jelly roll, such that any gas/fluid flow into or from the electrochemical element(s) encounters the blanket-like structure. Thus, the blanket-like structure may advantageously function to substantially limit the quantity of hot particulate residue, e.g., liquid electrolyte and electrolyte gas, that may be emitted from the electrochemical unit from undesirably interacting with adjacent electrochemical units/jelly rolls. The blanket-like structure(s) may feature flow characteristics that promote axial gas flow relative to the blanket-like structure, but that substantially reduces lateral (e.g., side-to-side) flow therewithin. Therefore, according to exemplary embodiments, gas and/or other fluids that are emitted by an electrochemical element/jelly roll is preferentially directed in a substantially axial manner through the blanket-like structure to an atmospheric region defined thereabove. To the extent the pressure within the atmospheric region exceeds an applicable pressure threshold, a vent mechanism associated with the present disclosure may be activated, whereby the gas is vented from the enclosure to the external environment.

Additional features, functions and benefits of the present disclosure will be apparent from the detailed description which follows, particularly when read in conjunction with the appended figures.

BRIEF DESCRIPTION OF THE FIGURES

The disclosure will be better understood on reading the description which follows, given solely by way of non-limiting example and made with reference to the drawings in which:

FIG. 2 is a top down view of a plurality of support member configurations according to this disclosure;

DETAILED DESCRIPTION

Multi-Core Array

Figure 1A:
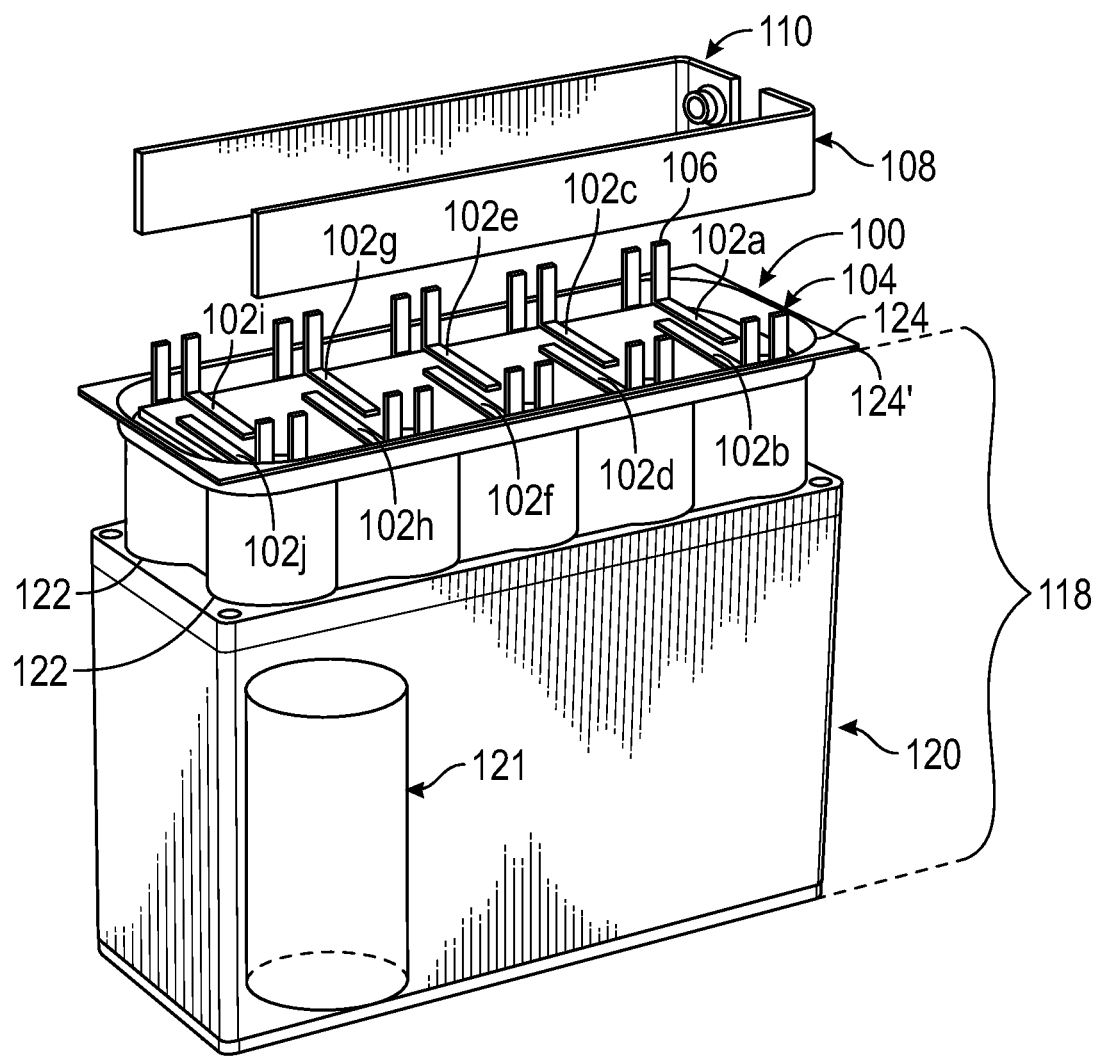
FIG. 1A is an exploded perspective view of the multicore, lithium ion battery according to this disclosure.
Figure 1B:
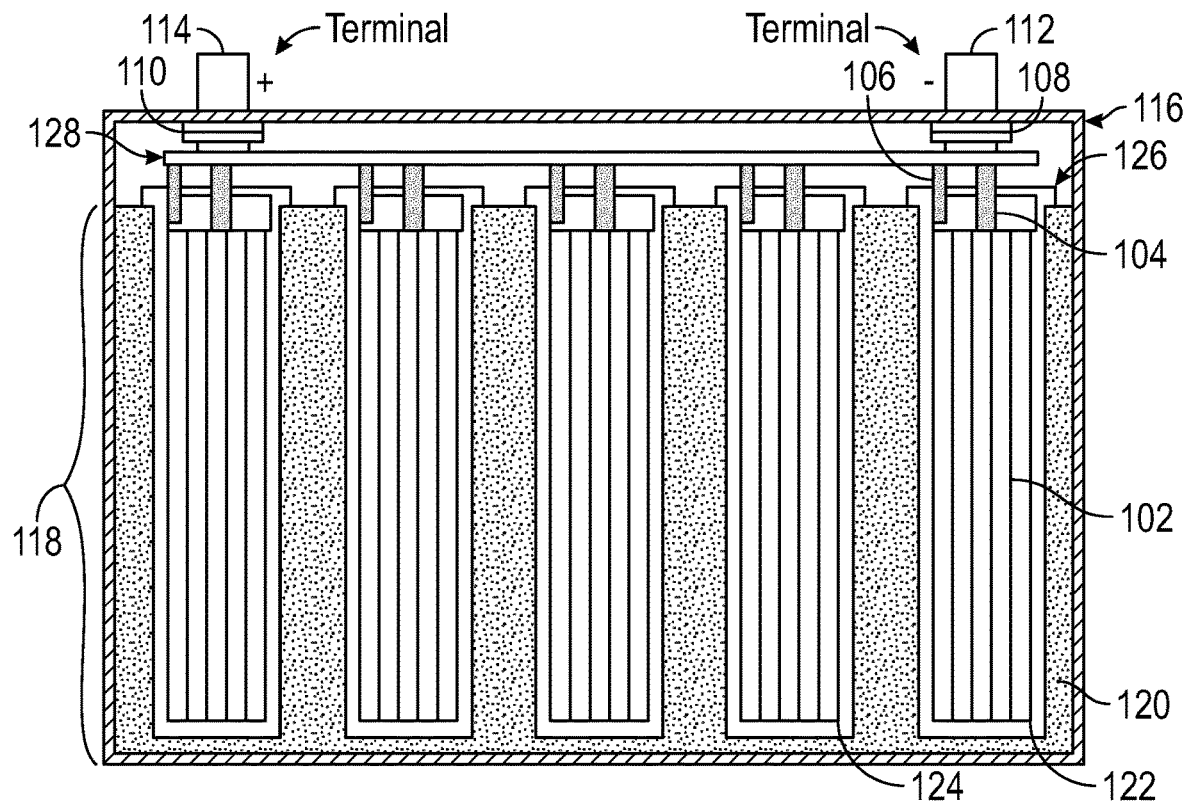
FIG. 1B is a cross-sectional view of the multicore, lithium ion battery according to this disclosure.

In FIGS. 1A and 1B there is shown a multi-core (MC) array 100 of lithium ion core members 102a-j, having a jelly roll cores structure and a cylindrical shape. Various shapes and size ion core members may be used in connection with this disclosure and certain shapes and sizes are described below. There is a set of electrically conductive tabs 104 connected to the cathodes of each of the core members 102a-j and a set of electrically conductive tabs 106 connected to the anodes of each of the core members 102a-j. Tabs 104 are also connected to cathode bus bar 108 and tabs 106 are connected to anode bus bar 110. The cathode tabs 104 and the anode tabs 106 are welded to the bus bars 108, 110 using spot welding or laser welding techniques. The bus bars 108, 110 are interconnected to positive terminal 112 and negative terminal 114, respectively, on the exterior of the MC enclosure 116. In this configuration, all of the ion core members 102a-j are connected in parallel, but they may be connected in series or in other configurations as will be apparent to those skilled in the art.

MC enclosure 116, FIG. 1B, is hermetically sealed. The support structure 120, which can be a part of the enclosure 116 or a separate part is constructed so that ion core members can be housed with adequate separation, so that limited expansion can take place during charge and discharge reactions thereby preventing mechanical interaction of the individual ion core members. Preferably enclosure 116 is made of plastic or ceramic materials, but can also be made of metal. If a metal is used, exposed steel is not preferred, and any steel container would need to be coated with an inert metal such as nickel. Preferred metals are Aluminum, Nickel or other inert metal to the chemicals used. Many types of plastic and ceramic as long as they are inert to the chemical and electrochemical environment. Examples of plastics and ceramics are polypropylene, polyethylene, alumina, zirconia. Enclosure 116 can include a fire retardant mesh affixed to the exterior of the enclosure for the purpose of preventing fire from reaching the interior of the enclosure.

Within enclosure 116, in lithium ion core region 118, is an electrically insulated support member 120 which can be made of ceramic, plastic, such as polypropylene, polyethylene, or other materials, such as aluminum foam. Support member 120 must be sufficiently deformable/compressible so as to protect the core members from damage when an impact occurs. In addition it is desired that the thermal conductivity be tailored to the application by means of dispersing heat during charge and discharge of the battery, creating a uniform temperature distribution, and by means of diverging heat during a catastrophic failure, such as an internal short causing thermal runaway of one core member. Proper heat dispersing properties would limit the chance of cascading runaway between cores. The support member can also be absorptive to electrolyte, which could be constrained in the support member, should it be expelled during abuse of the core member.

A deformable and kinetic energy absorbing support member 120 is particularly desirable, as it distributes impact loads over larger areas reducing the amount of local deformation at each core member 102a-j, thereby reducing the likelihood of an electric short circuit. Examples of kinetic energy absorbing materials are foams, such as aluminum foam, plastic foams, porous ceramic structures, honeycomb structures, or other open structures, fiber filled resins, and phenolic materials. An example of fiber fillers for plastic and resin materials could be glass fiber or carbon fibers. Examples of aluminum containing energy absorbers are aluminum foam, having open or closed pores, aluminum honeycomb structures, and engineered material such as the Altucore™ and CrashLite™ materials. As the support member collapses during impact, crash or other mechanical abuse, it is important that the cores, as much as possible, are protected from penetration as to avoid internal mechanically induced shorts. This creates a safer structure.

Figure 1C:
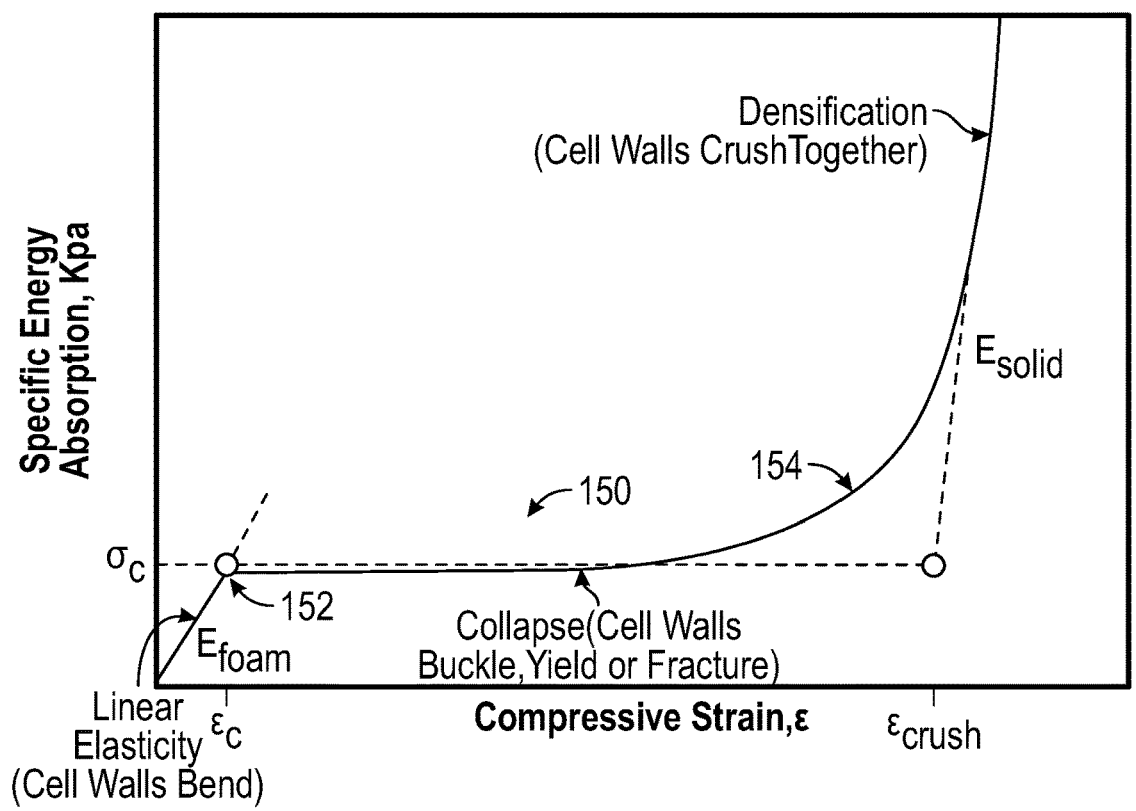
FIG. 1C is a stress-strain plot of an exemplary energy absorbing material of the support member according to this disclosure.

Energy absorbers are a class of materials that generally absorb kinetic mechanical energy by compressing or deflecting at a relatively constant stress over an extended distance, and not rebounding. Springs perform a somewhat similar function, but they rebound, hence they are energy storage devices, not energy absorbers. Once an applied stress exceeds the "crush plateau", see 150 of FIG. 1C, of the kinetic energy absorber material, the energy absorber will begin to compress at a fairly constant stress out to about 50-70% of strain of the material. This extended section of the stress/strain curve defines the behavior of an ideal energy absorber. In this zone, the area under the curve represents the product of stress x strain, or "work". In an actual block of energy absorber material of a finite size, such as support member 120, this would be represented as:

Force×Displacement

Recognizing that

Force (pounds)×Displacement (feet)=Work (foot-pounds)

and

Work (foot-pounds)=kinetic energy (foot-pounds)

The work that would be done to compress support member 120 is equivalent to the kinetic energy of a mass that might impact support member 120. When designed with appropriate thickness and compression strength, as will be apparent to one skilled in the art, support member 120 may be made of kinetic energy absorbing material could absorb all of the kinetic energy of an impact on the battery, for example in a crash of an electric vehicle. Most importantly, the cargo in the support members 120, i.e. the lithium ion core members 102a-j, would never see a force higher than the crush strength of the material (defined below). Thus, by absorbing the energy of the impacting mass over a controlled distance with a constant force, the protected structure, i.e., the lithium ion core members 102a-j, would not have to endure a concentrated high-energy/high force impact that would occur if the mass impacted the structure directly, with potentially catastrophic results.

When a load is applied to a structure made of an energy absorbing material, it will initially yield elastically in accord with the Young's modulus equation. However, at approximately 4-6% of strain, 152 of FIG. 1C, in this particular example of Al foam, depending on the structure size it will begin to buckle and collapse continuously at a relatively constant stress. Depending upon the initial relative density of the material, this constant collapse will proceed to approximately 50-70% of strain, 154 of FIG. 1C, for this Al foam material. At that point, the stress/strain curve will begin to rise as the energy absorbing material enters the "densification" phase. The point in the stress/strain curve where the material transitions from the elastic to plastic deformation phase defines the "crush strength" of the material.

The long, relatively flat section of the curve between the 4-6% transition and 50-70% of strain (covering approximately 45-65% of the possible strain values of the material), called the "crush plateau. This unique characteristic of kinetic energy absorbing materials makes them very useful to absorb the kinetic energy of an impacting mass while protecting the cargo being carried.

To further protect the core member, a cylindrical material made of metal, ceramic or plastic may be added as a sleeve 121, FIG. 1A, around the core structure. This sleeve can either be added directly surrounding the individual cores, on the outside of the liner material, or be applied the inside of the cavities structures in the support member. This prevents sharp objects from penetrating the cores. Although only one sleeve is shown in the figure it will be readily understood that sleeves would be included for each core member.

Figure 1D:
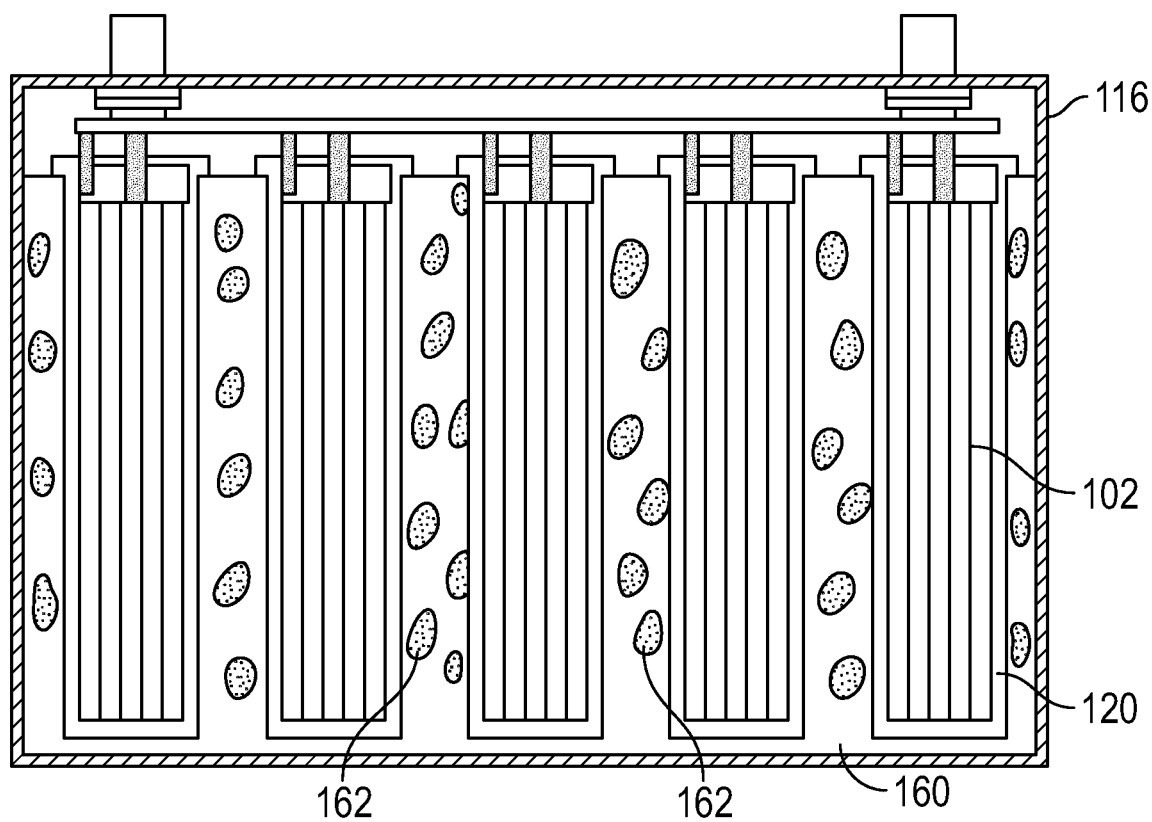
FIG. 1D is a cross-sectional view of another embodiment of multicore, lithium ion battery according to this disclosure.

Support member 120 could alternatively be designed with open regions 160, as shown in FIG. 1D, which contain filling materials 162. Examples of filling materials are irregularly or regularly shaped media, which can be hollow or dense. Examples of hollow media are metal, ceramic or plastic spheres, which can be made compressible at various pressure forces and with the purpose of functioning as an energy absorber for crash protection. Specific examples are aluminum hollow spheres, ceramic grinding media of alumina or zirconia, and polymer hollow spheres.

Support member 120 may also is optimized to transfer heat rapidly throughout the support member and distribute it evenly throughout the battery or limit heat exposure between cores, should one core experience thermal runaway during abuse. Besides greater safety, this will increase battery life by limiting maximum operating temperatures and enable the battery to have no, or passive, thermal management. Most importantly, the thermal characteristics of support member 120 help to prevent failure propagation from a failed core member to other core members due to the optimized heat transfer properties of the material and the ability to disrupt flame propagation. Since the material is also absorptive, it can absorb leaking electrolyte into the material which can help reduce the severity of a catastrophic failure.

Support member 120 increases overall safety of the MC battery by a) allowing the distribution of the ion core members 102a-j to optimize the battery for both safety and high energy density, b) arresting rapid thermal propagation ion core members 102a-j, while simultaneously allowing cooling, c) providing a protective crash and impact absorbing structure for ion core members 102a-j and the reactive chemicals, and d) use of a widely recognized fire proof material through flame arrest.

Cylindrical cavities 122 are formed in support member 120 for receiving the lithium ion core members 102a-i, one core per cavity. In this configuration, the cylindrical cavities 122 have openings 126 with a diameter that is slightly larger than those of the lithium ion core members 102. Openings 126 face and are exposed to shared atmosphere region 128 within enclosure 116. The walls of the cylindrical cavities 122 are advantageously fabricated such that electrolyte communication between adjacent cavities is prevented. Thus, the walls of the cavities 122 function to enclose the electrochemical units/jelly rolls positioned therewithin and prevent fluid passage from any individual cavity to any adjacent cavity.

Without having individual smaller enclosures (such as a can or polymer bag that hermetically provides a seal between the active core members), the anodes/cathodes of the core members are also directly exposed to the shared environment region 128. Not only does the elimination of the canned core members reduce manufacturing costs, it also increases safety. In the event of a failure of a core member and a resulting fire, the gasses expelled are able to occupy the shared environment region 128, which provides significantly more volume than would be available in a typical individually 'canned' core member. With the canned core member pressure build up, an explosion is more likely than with the present disclosure, which provides a greater volume for the gases to occupy and therefore reduced pressure build up. In addition, a can typically ruptures at much higher pressures than the structure of the disclosure, resulting in a milder failure mode with the present disclosure.

Within each cavity 122 is placed a thin cavity liner 124, which is positioned between support member 120 and lithium ion core members 102*a-i*. Typically, all cavity liners (in this case 10 corresponding to the number of cavities) are formed as part of a monolithic cavity liner member 124'. The liner is preferably made out of polypropylene, polyethylene, or any other plastic that is chemically inert to electrolyte. The liner may also be made of a ceramic or metal material, although these are at higher cost and non-preferred. However, in the case where the support member is electrically conductive, the liner must be electrically insulating so as to electrically isolate the core members from the support member. The cavity liners are important for multiple reasons. First, they are moisture and electrolyte impermeable. Secondly, they may contain flame retarding agents, which can quench a fire and thirdly, they allow a readily sealable plastic material to contain the electrolyte within a hermetic seal.

During manufacturing, cavities 122 can be simultaneously filled with electrolyte and then simultaneously formed and graded for capacity during the continued manufacturing process. The forming process consist of charging the cell to a constant voltage, typically 4.2V and then letting the cell rest at this potential for 12-48 hours. The capacity grading takes place during a charge/discharge process, where the cell is fully discharged to a lower voltage, such as 2.5V, then charged to highest voltage, typically in a range of 4.2-4.5V, and subsequently discharged again, upon which the capacity is recorded. Multiple charge/discharge cycles may be needed to obtain an accurate capacity grading, due to inefficiencies in the charge/discharge process.

The cavity liner enables a precise and consistent amount of electrolyte to be introduced to each core member, due to its snug fit with the core. One way to accomplish the filling is with through holes in enclosure 116 which can then be filled and sealed after the electrolyte has been introduced to the cavities and processed. A jelly roll type core member having about 3 Ah capacity will need about 4-8 g of electrolyte, depending on density and surrounding porous material. Electrolyte filling is done so that entire jelly roll is equally wetted throughout the roll with no dry areas allowed. It is preferred that each core member has the equivalent amount of electrolyte from core to core, with a variation within 0.5 g, and even more preferred within 0.1 g and yet even more preferred within 0.05 g. The variation adjusts with the total amount electrolyte and is typically less than 5% or even more preferred <1% of the total amount of electrolyte per core. Placing the assembly in a vacuum helps with this filling process and is crucial for full and equal wetting of the electrodes.

The size, spacing, shape and number of cavities 122 in support member 120 can be adjusted and optimized to achieve the desired operating characteristics for the battery while still achieving the safety features described above, such as mitigating failure propagation between/among core members 102.

As shown in FIG. 2, support members 220*a-h* may have different numbers of cavities, preferably ranging from 7 to 11, and different configurations, including support members having different size cavities as in the case of support members 220*d* and 220*h*. The number of cavities is always more than 2 and is not particularly limited on the upper end, other than by geometry of the support member and jelly roll size. A practical number of cavities are typically between 2 and 30. The cavities can be uniformly distributed, as in support member 220*f*, or they can be staggered, as in the case of support member 220*g*. Also shown in FIG. 2 are the cavity diameters and diameter of the core member that can be inserted into the cavities for each of the support members 220*a-h* depicted, in addition, the capacity of in Ampere hours (Ah) for each configuration is shown.

Figure 3:
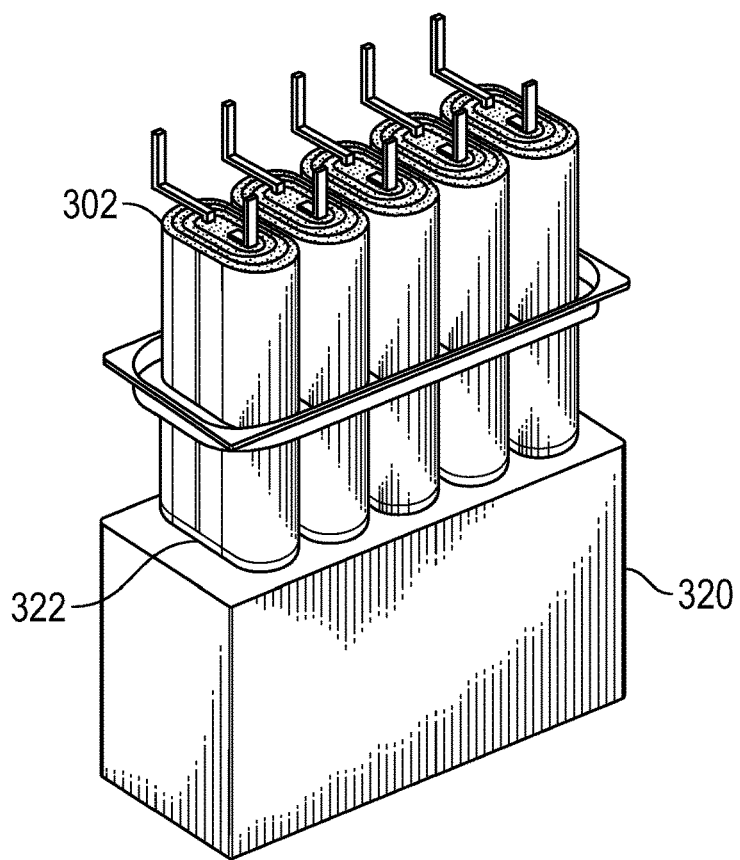
FIG. 3 is a perspective view of another embodiment of the multicore, lithium ion battery according to this disclosure.
Figure 4:
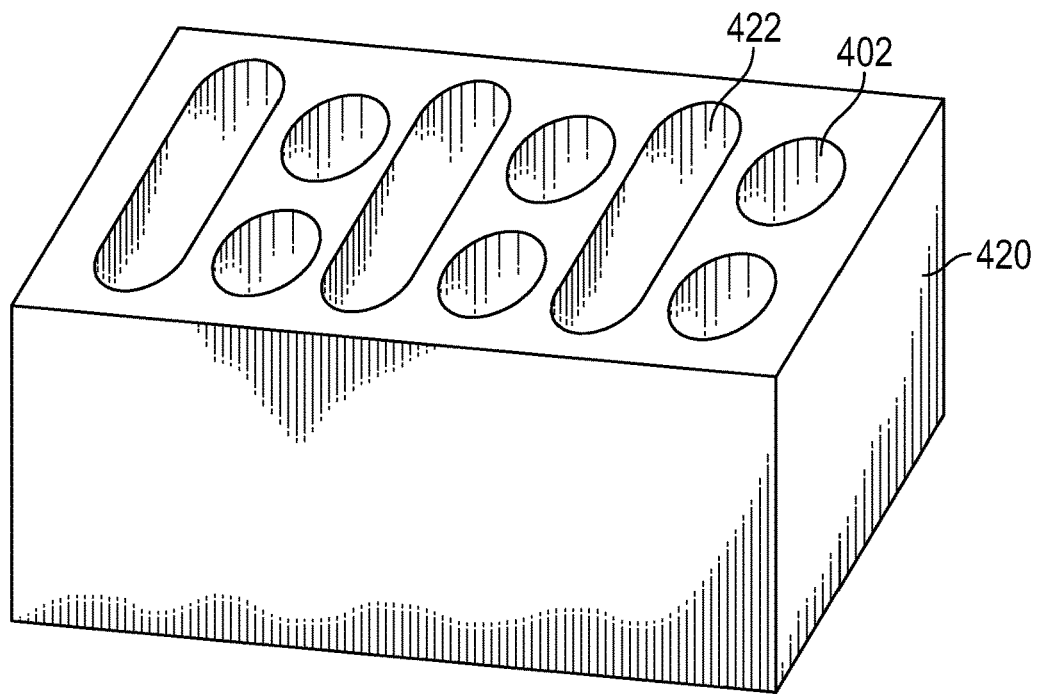
FIG. 4 is a perspective view of another embodiment of support member having mixed oblong and cylindrical cavities according to this disclosure.

Different shaped cavities and core members can be used as well. As shown in FIG. 3, support member 320 includes cavities 322 having an oblong shape for receiving like shaped core members 302. In FIG. 4, support member 420 has a mixture of oblong cavities 422 and cylindrical cavities 402 for receiving like shaped core members (not shown).

In an exemplary embodiment, when the MC battery has only core members arranged in parallel, the core members may contain one or more core members that are optimized for power and one or more core members that are optimized for energy. In another special case, the MC battery may have some core members with anode or cathode using certain materials and other core members utilizing anodes and cathodes using different materials. In yet another special case, the anode or cathode, may have different thickness electrodes. Any combination of having varying electrode thickness, cathode or anode active material, or electrode formulation may be combined in a parallel string, with the objective of tailoring the energy to power ratio of the battery. Some core members may be configured to withstand rapid power pulses, while other core members may be optimized for high energy storage thus providing a battery that can handle high power pulses, while having high energy content. It is important however that the core members have chemistry that is matched electrochemically, so as to provide chemical stability in the voltage window for the chemistry chosen.

For instance, a $LiCoO_2$ cathode can be matched with a $LiNi_{0.8}Co_{0.15}Al_{0.05}O_2$ cathode, as long as an upper potential of 4.2V is used and a lower potential of about 2V to 2.5V, however, as potential goes above 4.2V, to for instance 4.3V, for instance a magnesium doped $LiCoO_2$ material should not be matched with an NCA material, as the NCA material degrades at the higher voltages. However, in the latter example, the two materials can be mixed as long as the upper potential is limited to 4.2V. It is an objective of the disclosure to use blended cathode materials in the correct voltage range and the inventor has found certain combinations that are particularly useful for high energy or high power, elaborated on later in the description.

The power and energy optimization can take place by either adjusting the formulation of the electrode, such as using higher degree of conductive additive for increased electrical conductivity, or by using different thickness electrodes. Additionally the energy cores can have one set of active materials (cathode and anode) and the power cores another type of materials. When using this method it is preferred that the materials have matched voltage range, such as 2.5-4.2V or in case of high voltage combinations 2.5V-4.5V, so as to avoid decomposition. Upper voltage is characterized as above 4.2V and is typically below 5V per isolated core member in a Li-ion multi-core battery.

Prismatic Core Member

Figure 5:
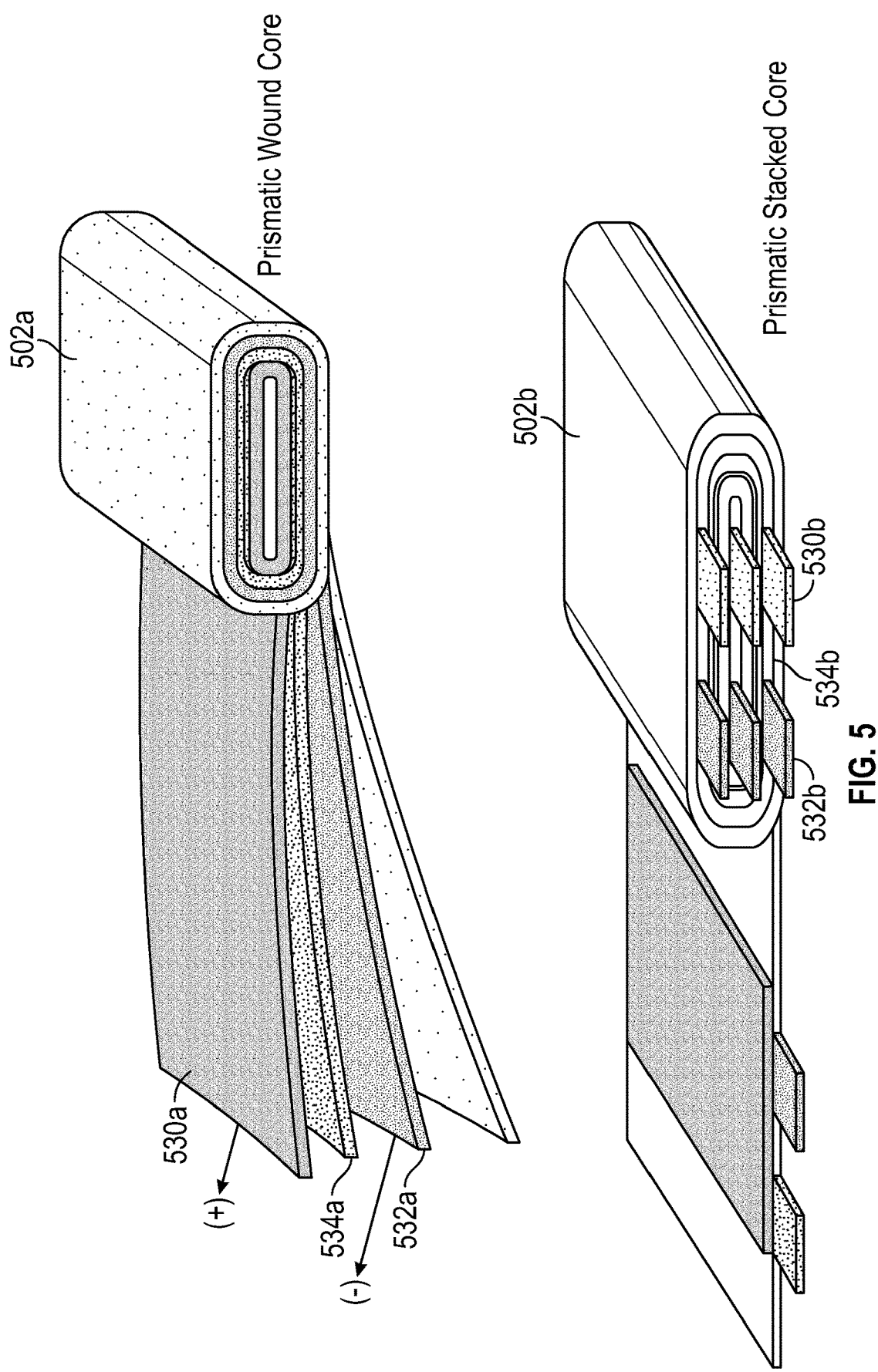
FIG. 5 is a perspective view of prismatic wound and stacked core members according to this disclosure.

In FIG. 5, an exemplary shape of core member 502a, suitable for this disclosure is shown. This is a jelly roll structure, but with a prismatic shape rather than cylindrical or oblong as previously described. The core member includes anode 530a, cathode 532a and electrically insulating separator 534a. Although not depicted in the previous figures each core member includes a separator between the anodes and the cathodes. Core member 502b is also prismatic in shape, however, a stacked construction is used, includes anode 530b, cathode 532b and separator 534b.

Serial Connection

Figure 6A:
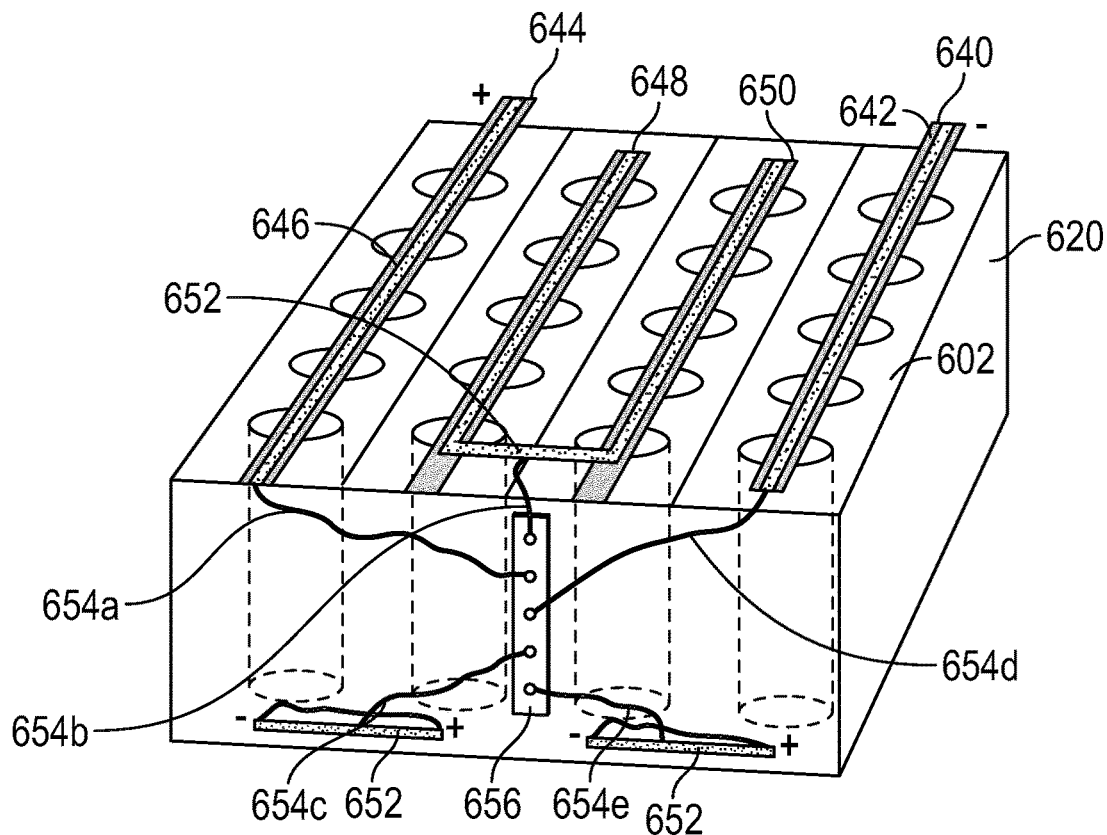
FIG. 6A depicts a parallel/series connected MC lithium ion battery according to this disclosure.

Thus far the core members have been shown electrically connected in a parallel, however, they may be connected in series or in a combination of parallel and series connections. As shown in FIG. 6, there is support member 620 (made of aluminum foam or polymer foam) together with inserted jelly rolls core members 602. For clarity, the tabs to the core members connecting to the bus bars are not shown, but present. Negative battery terminal connector 640 is electrically connected to the lower voltage bus bar 642. Positive battery terminal connector 644 is electrically connected to the high voltage bus bar 646. Adjacent block bus bars 648 and 650 connect each the core members in their respective rows in parallel. Each bus bar 642, 644, 648 and 650 has a complementary bus bar on the opposite side of the core member, which is not shown. Every parallel bus bar is individually connected in series through three connecting bars, 652, allowing a serial electrical path. Sensing cables 654a-654e are positioned on each electrical unique point, allowing detection of voltage levels across each of the parallel linked jelly roll voltage points in a serial system. These wires can also be used for providing balancing current to keep core members at the same state of charge during charge and discharge and are connected to a feed through contact 656. Those skilled in the art of cell balancing systems will realize the purpose of such connections within a unit of the disclosure having serially connected cores.

Figure 6B:
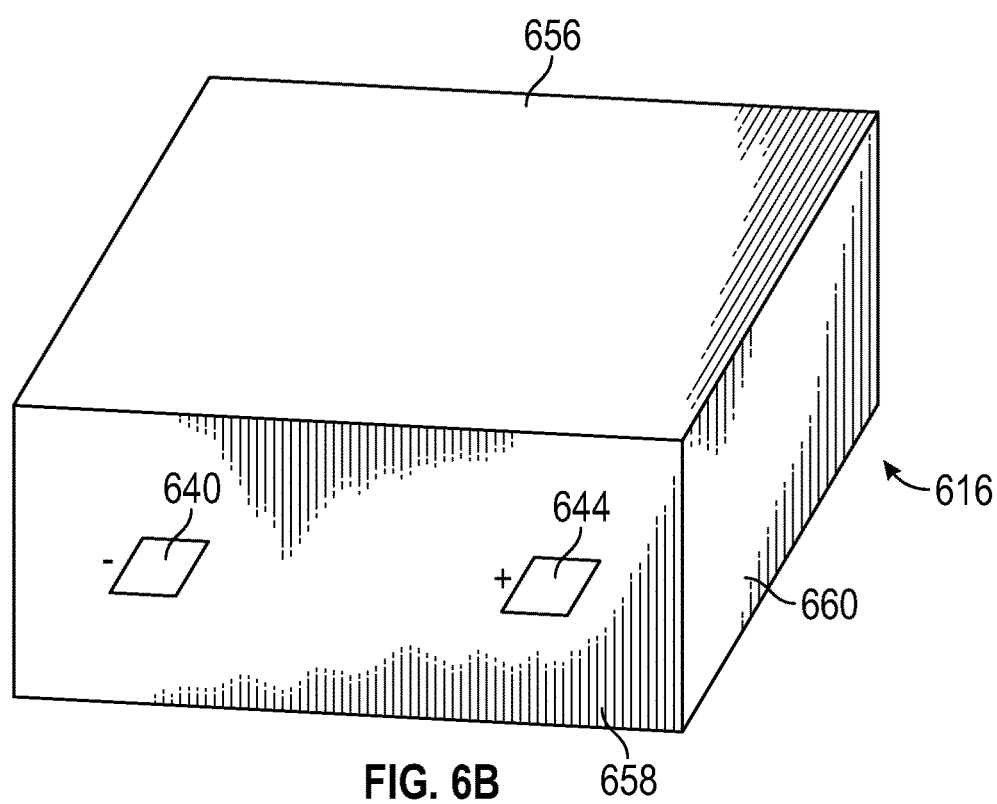
FIG. 6B is a perspective view of a parallel/series connected MC lithium ion battery according to this disclosure.

FIG. 6B shows an enclosure 616 that houses the support member 320. Enclosure 616 consist of a plastic lid 658 and a box 660 that are hermetically sealed through ultrasonic welding. At the end of enclosure 616 opposite the side of lid 658 is the feed through sensing contact 656. Extending from lid 658 are negative battery terminal connector 640 and positive battery terminal connector 644. It can be understood that various arrangements as to the position of the connectors sensing contact can be achieved by those skilled in the art and also that different serial or parallel arrangement cells can be used for the purpose of the disclosure.

In the case of a metal lid it is closed with welding methods, such as laser welding, and in the case of plastics, adhesives (glues) can be used, or thermal or ultrasonic weld methods can be used, or any combination thereof. This provides for a properly sealed MC battery. Jelly rolls are connected in parallel or series inside the enclosure.

All feedthroughs, sensing, power, pressure, etc., needs to be hermetically sealed. The hermetical seals should withstand internal pressure of in excess or equal to about 1 atm and also vacuum, preferably more than 1.2 atm. A vent can also be housed on the container, set at a lower internal pressure than the seal allows.

Another way of providing balancing and sensing ability is to have individual connectors that provide an external lead from each of the positive and negative terminals of individual core members allowing connectors external to the container to connect with each of the individual core members. The balancing circuit detects imbalance in voltage or state-of-charge of the serial cells and would provide means of passive of active balancing known to those skilled in the art. The connecting leads are separate from the terminals providing means of leading current from the cells for the purpose of providing power from the battery and typically only used when cells are connected in series within one container. The sensing leads can optionally be fused outside the container, for avoidance of running power currents through the individual jelly rolls through the sensing circuit.

Shared Wall Compartmentalization

Figure 7:
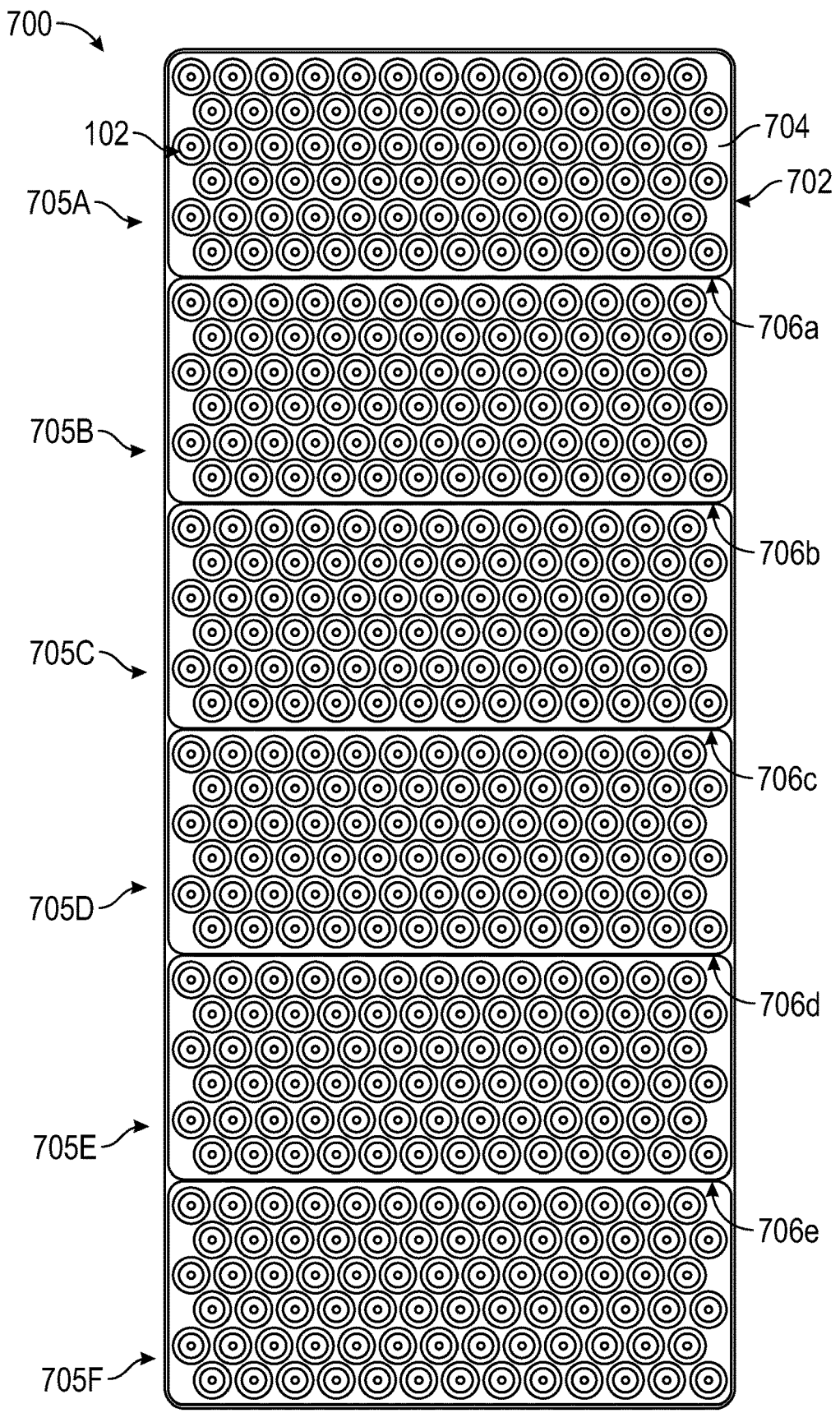
FIG. 7 is a top down view of a modular enclosure according to this disclosure.

In an exemplary embodiment, as shown in FIG. 7, module 700 includes a compartmentalized enclosure 702 that further includes a plurality of support members 704—e.g., a distinct support member 704 in each compartmentalized region 705. Support members 704, as described above, house lithium ion core members 102, e.g., open jelly rolls with a substantially cylindrical shape. In the exemplary embodiment of FIG. 7, the lithium ion core members are arrayed in a series of rows that are staggered relative to adjacent rows to increase the density of electrochemical unit deployment. Various shapes and size lithium ion core members may be used in connection with this disclosure and certain shapes and sizes are described throughout this disclosure. Of note, the teachings described above are incorporated into this subheading, unless otherwise stated. In this configuration, all lithium ion core members 102 are connected in parallel, but they may be connected in series or in other configurations as will be apparent to those skilled in the art.

In one embodiment, included within enclosure 702 is a set of electrically conductive tabs (not shown) connected to the cathodes of each core member 102 and a set of electrically conductive tabs (not shown) connected to the anodes of each core member 102. Tabs (not shown) are also connected to cathode bus bar (not shown) and tabs (not shown) are connected to anode bus bar (not shown). The cathode tabs (not shown) and anode tabs (not shown) are welded to bus bars (not shown) using spot welding or laser welding techniques. Bus bars (not shown) are interconnected to positive terminal (not shown) and negative terminal (not shown), respectively, on the exterior of module enclosure 702.

In another embodiment, included within enclosure 702 is a first bus bar (not shown) interconnecting the anodes of the core members to a positive terminal member of the terminal external to the enclosure, and the second bus bar (not shown) interconnecting the cathodes of the core members to a negative terminal member of the terminal external to the enclosure 702. A bus bar may be used for pressure disconnect configurations, described in more detail below. The first and second bus bars may be fabricated from any conductive material, particularly, aluminum and/or copper.

Support member 704, which can fabricated as part of enclosure 702 or as a separate part, defines cavities that are configured and dimensioned so that lithium ion core members 102 positioned therewithin have sufficient space such that limited expansion can take place during charge and discharge reactions, thereby preventing mechanical interaction of the individual lithium ion core members during typical charge/discharge operations. Preferably, support members 704 are fabricated from a plastic or ceramic material, but fabrication (in whole or in part) from a metal is also contemplated. Enclosure 702 may also be fabricated from various materials, e.g., plastic, ceramic, metal and combinations thereof. If a metal is used, exposed steel is not preferred, and it is generally advantageous to coat a metallic (e.g., steel) enclosure 702 with an inert metal such as nickel. Preferred metals are aluminum, nickel or other metal that is inert to the chemicals used. A variety of plastics and ceramics may be used as long as they are inert to the chemical and electrochemical environment. Examples of plastics and ceramics are polypropylene, polyethylene, alumina, zirconia. Enclosure 702 may also include a fire retardant mesh affixed to the exterior of the enclosure for the purpose of preventing fire from reaching the interior of the enclosure.

In one embodiment, a lid (not shown) may be secured to enclosure 702 to form a hermetically sealed system. The lid may be secured to the enclosure 702 using traditional fabrication techniques. In the case of metal components, welding methods, such as laser welding, may be used to secure a lid with respect to enclosure 702. In the case of plastics, adhesives (glues), or thermal or ultrasonic weld methods may be used, or any combination thereof.

In another embodiment, a first plate and side walls are joined to form a enclosure 702, using traditional fabrication techniques. In the case of metal components, welding methods, such as laser welding, may be used to form enclosure 702. In the case of plastics, adhesives (glues), or thermal or ultrasonic weld methods may be used, or any combination thereof. Once the operative elements are positioned within enclosure 702, a second plate (or lid) may be secured thereto to define a hermetically sealed system.

In the exemplary embodiment depicted in FIG. 7, enclosure 702 further includes six (6) distinct compartmentalized regions 705 containing six distinct support member(s) 704. The compartmentalized regions 705 (i.e., compartmentalized regions 705(A)-705(F)) are separated by shared walls 706 (i.e., shared walls 706(*a*)-706(*e*)). Shared walls 706 may be fabricated from the same or a similar material as is used in fabrication of enclosure 702. Further, shared walls 706 may be fabricated as an integral part of enclosure 702 (e.g., integral with the base or a side wall of enclosure 702), or may be fabricated as a separate component that is attached to enclosure 702 using fabrication techniques as described above. Further, shared wall(s) may define partial walls or may define full walls. For partial shared walls 706, enclosure 702 would define a shared atmosphere across and between adjacent compartmentalized regions; however, for full shared walls 706, i.e., shared walls that extend from the base to the top/lid of the battery system, each compartmentalized region would have an individual/distinct (i.e., unshared) atmospheric region. In implementations where the electrochemical units are deployed in a serial connection, full shared walls 706 may be advantageously utilized to fully isolate each compartmentalized region 705, e.g., to prevent communication of a first shared atmosphere region with a second shared atmosphere region (and similar isolation by the full shared walls between all adjacent compartmentalized regions).

Since enclosure 702 features a continuous surface (e.g., top plate, bottom plate, side wall) that is in direct communication with each compartmentalized region 705, a cooling plate or cooling element may be in contact with and/or attached with respect to a continuous surface (e.g., top plate, bottom plate, side wall) of enclosure 702 to facilitate cooling of electrochemical units 102 positioned therewith. Inclusion of a cooling plate/cooling element may function to eliminate the need for other cooling features, e.g., an interspaced cooling circuit woven between the cells, thereby providing cost-savings as compared to certain conventional systems. In another embodiment, individual cooling plates/cooling elements may be positioned within each compartmentalized region 705 and the features/geometries of the individual cooling plates/cooling elements may vary from compartmentalized region-to-compartmentalized region, e.g., based on the design and operation of the electrochemical units positioned with such compartmentalized regions 705.

Incorporating individual compartmentalized regions 705 within one enclosure 702 allows for a more efficient and cost-effective packaging and the ability to house substantially more lithium ion core members in a comparable volume using conventional packaging techniques that involve separate battery modules. For example, with reference to the exemplary embodiment of FIG. 7, six distinct compartmentalized regions 705 are schematically depicted. In conventional battery systems, each of those compartmentalized regions would take the form of a distinct battery module. In the conventional systems, when two modules are placed side-by-side, an outer wall of the first battery module would be in physical contact with an opposed outer wall of the second battery module. In the advantageous battery system depicted in FIG. 7, effectively five walls are eliminated because a single shared wall 706 is positioned between adjacent compartmentalized regions 705 (rather than side-by-side outer walls). In this way, additional "real estate" is provided for energy-producing electrochemical units when comparing a similar overall form factor dimension. Further, the elimination of the individual enclosures and the use of a shared wall between adjacent compartmentalized regions reduces cost by eliminating additional and/or redundant materials. The multi-compartmentalized region of exemplary enclosure 702 is easily scalable and may vary in size to meet desired size and power output for a particular customer and/or application. Of note, according to the exemplary approach depicted in FIG. 7, the number of compartmentalized regions is always at least two (i.e., there is at least one shared wall 706), but is scalable to significantly larger sizes, as will be apparent to persons skilled in the art.

As noted above, in the exemplary embodiment of FIG. 7, enclosure 702 includes six compartmentalized regions 705A-F and five shared walls 706*a*-*e*. Within each compartment 705 is a support member 704, which is configured to maximize the quantity of ion core members 102 housed therein; see FIG. 2 for exemplary ion core member 102 cavity configurations. In an illustrious embodiment, support member 704 includes 78 ion core members 102 housed in an off-centered/staggered configuration, per compartmentalized region. Accordingly, 468 ion core members 102 are housed within the six evenly distributed compartmentalized regions 705 of enclosure 702.

Further, in implementations where core members 102 are electrically connected in parallel, enclosure 702 safely supports a shared atmosphere across and between compartmentalized regions, at least in part because the vapor pressures generated by the "open" jelly rolls are lower than in systems that place the core members 102 in serial connection. As noted above, a shared atmosphere between and among adjacent compartmentalized regions 705 is provided when the shared wall 706 between the adjacent compartmentalized regions extends only a partial distance from the base plate to the top plate/lid of enclosure 702. Due to the spacing between the partial shared wall and at least one boundary/outer wall of enclosure 702, the relevant compartmentalized regions are not hermetically sealed relative to each other. The shared atmosphere permits communication of vapors—and a sharing of pressure build-up—across and between the individual compartmentalized regions 705. In the event of instability and/or a failure of a core member, the gasses expelled from such core member are able to occupy the shared atmosphere region, which provides significantly more volume to accommodate such gas/pressure build-up (and shared venting/pressure disconnect functionality) as compared to conventional modular battery systems.

A cavity liner may be placed/positioned within each cavity of the support member(s) 704, and the lithium ion core members 102 may be positioned within the noted liners. All cavity liners (e.g., in the exemplary embodiment depicted in FIG. 7, seventy eight (78) cavity liners corresponding to the number of cavities/lithium ion core members in each compartmentalized region) may be formed as part of a monolithic cavity liner member or they may be individually formed. The cavity liner is generally fabricated from polypropylene, polyethylene, or any other plastic that is chemically inert to electrolyte. The liner may also be made of a ceramic or metal material. However, in the case where the support member is electrically conductive, the cavity liners are generally electrically insulating so as to electrically isolate the lithium ion core members from the support member. The disclosed cavity liners may serve several beneficial functions, e.g., the cavity liners (i) are moisture and electrolyte impermeable, (ii) may contain flame retarding agents, which can quench a fire, and/or (iii) facilitate maintaining the electrolyte associated with each lithium ion core member within a hermetic seal.

During manufacturing, cavities of the support member can be simultaneously filled with electrolyte and then simultaneously formed and graded for capacity during the continued manufacturing process. The forming process may include charging the cell to a constant voltage, e.g., 4.2V and then letting the cell rest at this potential for a period of time, e.g., 12-48 hours. The capacity grading generally takes place during a charge/discharge process, where the cell is fully discharged to a lower voltage, such as 2.5V, then charged to a higher voltage, typically in a range of 4.2-4.5V, and subsequently discharged again, upon which the capacity is recorded. Multiple charge/discharge cycles may be needed or used to obtain an accurate capacity grading.

The disclosed cavity liner enables a precise and consistent amount of electrolyte to be introduced to each core member, due to its snug fit with the core. One way to accomplish the filling is with through holes in enclosure 702 which can then be filled and sealed after the electrolyte has been introduced to the cavities. A jelly roll type core member having about 3 Ah capacity may need about 4-8 g of electrolyte, depending on density and surrounding porous material. Electrolyte filling is generally undertaken so that entire jelly roll is equally wetted throughout the roll with no dry areas allowed.

The size, spacing, shape and number of cavities in support member 704 can be adjusted and optimized to achieve desired operating characteristics for the battery while still achieving "packing density" and safety features as described above, such as mitigating failure propagation between/among core members 102.

Further, in a shared atmosphere enclosure, at least one pressure disconnect device/feature may be incorporated within and/or on a face of enclosure 702. The pressure disconnect device/feature may be of the type disclosed in U.S. non-provisional patent application, assigned Ser. No. 15/562,792 to Onnerud et al. The contents of the foregoing application is incorporated by reference herein. The pressure threshold, as mentioned below, may be greater than 5 psig, e.g., 5 psig to 40 psig.

In exemplary embodiments, a pressure disconnect device ("PDD") advantageously electrically isolates electrochemical units 102 associated with the lithium ion battery in response to a build-up of pressure within enclosure 702 that exceeds a predetermined pressure threshold. The PDD includes a deflectable dome structure and a fuse assembly positioned on an external face of enclosure 702 that is adapted, in response to a pressure build-up within enclosure 702 beyond a threshold pressure level, to electrically isolate lithium ion battery components within enclosure 702. Attached to the fuse assembly is a structural feature that is aligned with the center line of the deflectable dome.

When the internal pressure reaches the PDD threshold value, the deflectable dome pops up to contact the structural feature causing a short circuit between positive and negative terminals, which results in fuse failure. After the fuse has failed (i.e., "blown"), the negative terminal connecting to the external circuit is isolated from jelly rolls in the container, and the negative terminal is kept connecting to the positive terminal via enclosure 702 and structural feature, resulting in current directly flowing from the negative terminal to enclosure 702, i.e., by-passing jelly rolls 102.

In another exemplary embodiment, overcharge electrical disconnect feature advantageously electrically isolates electrochemical units 102 associated with the lithium ion battery in response to a build-up of pressure within enclosure 702 that exceeds a predetermined pressure threshold. The overcharge electrical disconnect feature leverages the known characteristics of enclosure 702, i.e., battery case expansion in response to an increase in internal pressure, to disconnect electrochemical units 102 from enclosure 702. Applicant's concurrently filed provisional patent application entitled "Overcharge Electrical Disconnect Feature" discloses exemplary embodiments thereof, the content of which is hereby incorporated by reference.

As mentioned above, enclosure 702 may include a bus bar that is in electrical contact with electrochemical units 102 and in electrical contact with a deflectable surface of the enclosure 702, e.g., a deflectable bottom plate. As the internal pressure of enclosure 702 increases, the potential for expansion and deformation of enclosure 702 will also increase. Top and bottom plate have the largest surface area and therefore will generally have the greatest potential to expand/bulge as compared to the side walls. As a force is applied against the bottom plate, due to an increased internal pressure, the resistance welds, attaching the bus bar to the bottom plate, will be under stress and will ultimately cause the resistance welds to break/pop, which creates gap between the bus bar and the bottom plate. The gap electrically disconnects the jelly rolls from the bottom plate of enclosure 702.

As mentioned above, within each compartmentalized region 705 (i.e., regions 705A-705F) is an electrically insulated support member 704 which may be fabricated from ceramic, plastic, such as polypropylene, polyethylene, or other materials, such as aluminum foam. Support member 704 may be sufficiently deformable/compressible so as to protect the core members 102 from damage when/if an impact occurs. In addition, it is desired that the thermal conductivity be tailored to the application by means of dispersing heat during charge and discharge of the battery, creating a uniform temperature distribution, and by means of diverging heat during a catastrophic failure, such as an internal short causing thermal runaway of one core member. Proper heat dispersing properties would limit the chance of cascading runaway between cores. Support member 704 may also be absorptive to electrolyte, which may be constrained in support member 704, should it be expelled during abuse of core member 102.

A deformable and kinetic energy absorbing support member 704 is particularly desirable, as it distributes impact loads over larger areas reducing the amount of local deformation at each core member 102, thereby reducing the likelihood of an electric short circuit. Examples of kinetic energy absorbing materials are foams, such as aluminum foam, plastic foams, porous ceramic structures, honeycomb structures, or other open structures, fiber filled resins, and phenolic materials. An example of fiber fillers for plastic and resin materials could be glass fiber or carbon fibers. Examples of aluminum containing energy absorbers are aluminum foam, having open or closed pores, aluminum honeycomb structures, and engineered material such as the Altucore™ and CrashLite™ materials. As the support member collapses during impact, crash or other mechanical abuse, it is important that the cores, as much as possible, are protected from penetration as to avoid internal mechanically induced shorts. This creates a safer structure. Further discussion with regards to energy absorbers is disclosed above and with further reference to FIG. 1C.

Support member(s) 704 may be sufficiently deformable/compressible so as to protect the core members 102 from damage when/if an impact occurs. In addition, it is desired that the thermal conductivity be tailored to the application by means of dispersing heat during charge and discharge of the battery, creating a uniform temperature distribution, and by means of diverging heat during a catastrophic failure, such as an internal short causing thermal runaway of one core member. Proper heat dispersing properties would limit the chance of cascading runaway between cores. Support member 704 may also be absorptive to electrolyte, which may be constrained in support member 704, should it be expelled during abuse of core member 102.

A deformable and kinetic energy absorbing support member 704 is particularly desirable, as it distributes impact loads over larger areas reducing the amount of local deformation at each core member 102, thereby reducing the likelihood of an electric short circuit. Examples of kinetic energy absorbing materials are foams, such as aluminum foam, plastic foams, porous ceramic structures, honeycomb structures, or other open structures, fiber filled resins, and phenolic materials. An example of fiber fillers for plastic and resin materials could be glass fiber or carbon fibers. Examples of aluminum containing energy absorbers are aluminum foam, having open or closed pores, aluminum honeycomb structures, and engineered material such as the Altucore™ and CrashLite™ materials. As the support member collapses during impact, crash or other mechanical abuse, it is important that the cores, as much as possible, are protected from penetration as to avoid internal mechanically induced shorts. This creates a safer structure. Further discussion with regards to energy absorbers is disclosed above and with further reference to FIG. 1C.

Structure for Controlling Gas/Fluid Flow from Electrochemical Unit(s)

Figure 8:
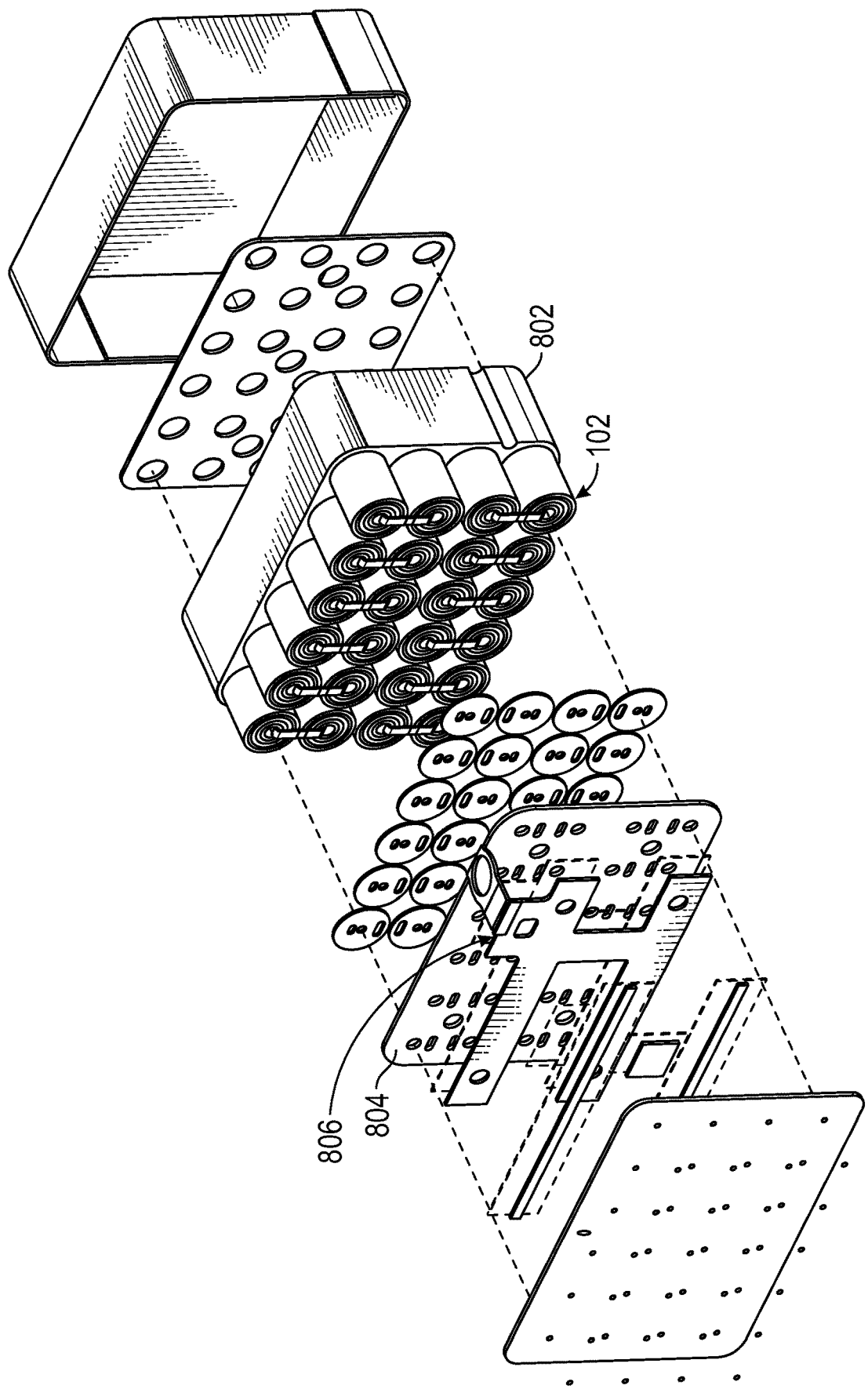
FIG. 8 is an exploded perspective view of a MC lithium ion battery according to this disclosure.

In an exemplary embodiment, enclosure 116, 616, 702 may include a structure for controlling gas/fluid flow from electrochemical unit(s) positioned therewithin. In exemplary embodiments and as shown in FIG. 8, the disclosed structure for controlling gas/fluid flow may take the form of blanket or mat 804 positioned in contact with (or in close proximity to) jelly roll assemblies 102—particularly the open end of jelly roll assemblies 102—housed within support member 120, 620, 702, 802. Blanket 804 substantially limits the quantity of hot particulate residue, e.g., liquid electrolyte and electrolyte gas, from interacting with adjacent jelly rolls 102 if/when released from one or more jelly roll(s). In exemplary embodiments, blanket 804 includes apertures/features that facilitate charging of electrolyte and electrical connection between the electrochemical units and an associated bus bar.

Blanket 804 generally features flow characteristics that promote axial gas and fluid flow through blanket 804, but substantially reduces lateral (e.g., side-to-side) flow within blanket 804. Therefore, particulates associated with such gas/fluid flow are forced through the body of blanket 804 and into the shared atmosphere of enclosure 116, 616, 702 (or individual compartmentalized region 707). To the extent an applicable threshold pressure is reached within the shared atmosphere, the particulate-containing gas/fluid is vented from the enclosure.

In an illustrious embodiment, blanket 804 is fabricated from a ceramic material (or similar material) with a pore size/structure that promotes axial flow therethrough. The ceramic material is typically stable at relatively high temperatures, e.g., greater than 200° C. In exemplary embodiments of the present disclosure, the pore size of the disclosed blanket is sized so as to (i) capture larger hot particulates/debris, e.g., larger sized carbonized debris, metal debris, metal oxide particulates and melted metal particulates, so as to ensure those larger particulates/debris do not contact adjacent jelly rolls 102, and (ii) facilitate smaller particulates and gas in passing through blanket 804 and out the vent (if the vent is activated). Smaller particulates for purposes of the present disclosure are those particulates that will pass freely through the vent so as to not become trapped/clogged within the vent outlet. In an illustrious embodiment, blanket 804 is installed beneath bus bar 806; however, blanket 804 may be installed above bus bar 806.

Although the disclosed structure for controlling gas/fluid flow from electrochemical unit(s) is described/depicted as a blanket 804, it is noted that the desirable functionality of controlling gas/fluid flow may be achieved by a plurality of discrete elements that are positioned in proximity to the electrochemical units, e.g., in a one-on-one manner. Thus, individual gas/fluid flow elements may be positioned in proximity to the open end of individual jelly rolls to facilitate axial/non-lateral flow of gas/fluid that is expelled from the jelly rolls—while capturing larger particulates—as described above with reference to blanket 804. In like manner, the disclosed structure for controlling gas/fluid flow may be configured/dimensioned as a structure that provides flow control functionality with respect to a sub-set of electrochemical units positioned within the enclosure, e.g., a row or column of electrochemical units.

Enclosure Embodiments

Figure 9A:
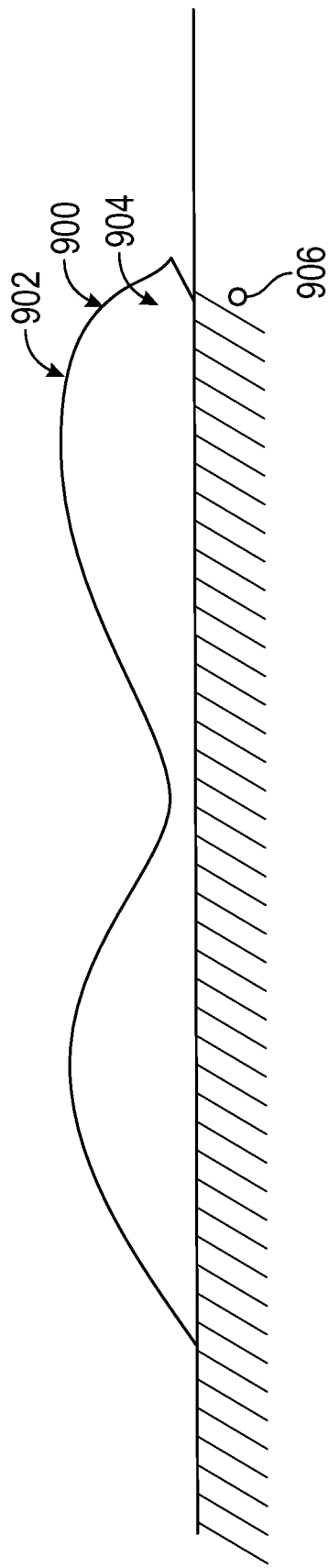
FIG. 9A is a cross-sectional view of an egg-box shaped wall of the enclosure according to this disclosure.
Figure 9B:
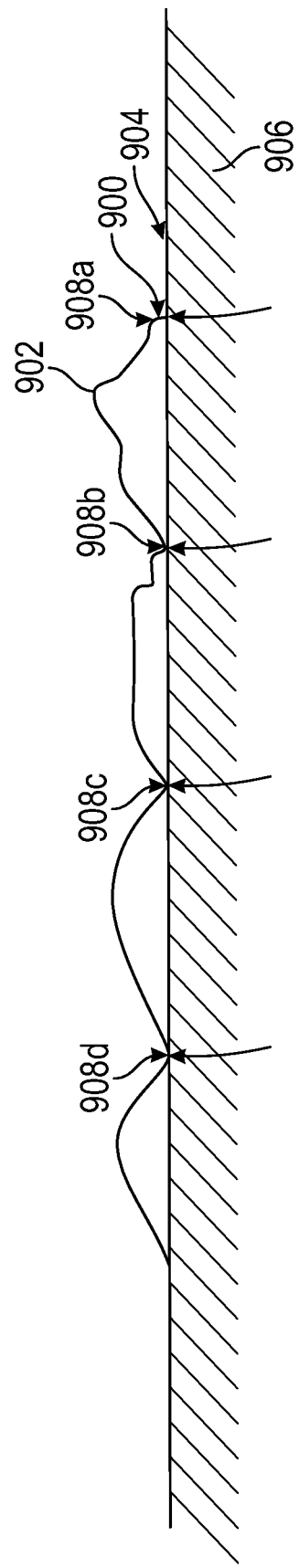
FIG. 9B is a cross-sectional view of an egg-box shaped wall of the enclosure according to this disclosure during a mechanical impact on the wall.

In a further exemplary embodiment of the present disclosure and with reference to FIG. 9A, enclosure 116, 616, 702 may be configured with an egg box shaped wall 900, such that upon mechanical impact on the enclosure, the MC battery can be short circuited externally of the enclosure. Egg box shaped portion 902 of the wall 900, made out of aluminum, contacts a plate of non conductive material 904, made of polyethylene plastic (prior to impact). A second plate 906, which is made out of aluminum or other conductive material, is located below the plastic plate 904. The egg box shaped material 902 is connected to either the negative or the positive pole of the MC battery and the other conductive plate 906 is connected to the opposite pole. Upon impact, nail penetration, or non-normal pressure on the wall, such as in a crash, the egg box shaped wall 902 compresses so that the plastic plate 904 is penetrated and makes contact with conductive plate 906 external contact points 908*a-d*, FIG. 9B, creating an external electrical short circuit in the MC battery.

The individual core members are typically connected by means of an internal bus bars, as described above. Sometimes the bus bar common connector may be a wire or plastic coated wire. It can also be a solid metal, such as copper, aluminum or nickel. This bus bar connects multiple core members in series or parallel and has the capability of transferring currents in the multi-core member structure to a connector, allowing an external connection to the multi-core array. In the case of external bus bar individual feed through connectors through the enclosure from each jelly roll would be needed.

Whether internal or external bus bars are used, they may be constructed to provide a fuse between the core members. This may be accomplished in a variety of ways, including creating areas where the cross section of the bus bar is limited to only carry a certain electrical current or by limiting the tab size, which connects the core member to the bus bar. The bus bar or tabs may be constructed in one stamped out piece, or other metal forming technique, or by using a second part that connects the divisions of the bus bars with a fuse arrangement. For instance, if two rectangular cross section areas of copper bus bars are used, where anode and cathode tabs of 10 core members are connected to each of by the bus bar, each bus bar having a cross sectional surface area of 10 mm$^2$, at least one area on the bus bar can be fabricated to have a reduced surface area compared to the rest of the bus bar. This provides a position where fusing occurs and current carrying capability is limited. This fuse area may be at one or more points of the bus bar, preferably between each core member, but most effective in the case of many cells at the mid-point. If an external short were to occur, this fuse would limit the heating of the core members and potentially avoid thermal runaway. Also in the case of internal shorts in a core member, either due to manufacturing defects or due to external penetration during an abuse event, such as a nail, that penetrates into the core members causing an internal short to the cell, this fuse arrangement may limit the amount of current that is transferred to the internal short by shutting of the malfunctioning core to the other parallel cores.

Empty space inside the enclosure can be filled with shock absorbing materials, such as foam or other structure that allows less impact to the core members, thereby further reducing the risk of internal shorts. This ruggedization may also provide means of shifting the self-vibration frequency of the internal content to the enclosure, providing increased tolerance to shock and vibration and mechanical life. The filler material should preferably contain fire retardant materials that would allow extinguishing of any fire that could arise during thermal runaway of the cell or melt during the same thermal runaway, thereby taking up excess heat and limit the heating of a cell. This provides for increased safety in the case of catastrophic event.

Examples of fire retardants can be found in the open engineering literature and handbooks, such as Polyurethanes Handbook published by Hanser Gardner Publications or as described in U.S. Pat. No. 5,198,473. Besides polyurethane foam also epoxy foams or glass fiber wool and similar non-chemically or electrochemically active materials, may be used as filler materials in empty spaces inside the enclosure. In particular, hollow or dense spheres or irregularly shaped particulates made of plastic, metal or ceramic may be used as low cost fillers, in the case of hollow spheres, these would provide additional means for energy absorption during a crash scenario of the multi core cell. In a special case, the support member is aluminum foam. In another special case, the support member is dense aluminum foam between 10-25% of aluminum density. In yet another special case, the pores in the aluminum foam has an average diameter that is less than 1 mm.

Enclosure 116, 616, 702 may further be configured with a clamshell configuration, wherein symmetrically identical side wall components are attached together along a pair of seams to define enclosure 116, 616, 702. In one exemplary embodiment, the side wall components attach along a vertical seam centrally located on enclosure 116, 616, 702. In another exemplary embodiment, the clamshell configuration attaches along a horizontal seam centrally located on enclosure 116, 616, 702. In yet another exemplary embodiment, the clamshell configuration attaches along an angled seam that symmetrically divides enclosure 116, 616, 702. In yet another exemplary embodiment, the exterior of both side wall components are identical, but the interior base of one or both of the side wall components includes a partial or full separating wall, e.g., shared wall, for formation of individual compartmentalized regions within enclosure 702.

Figure 10:
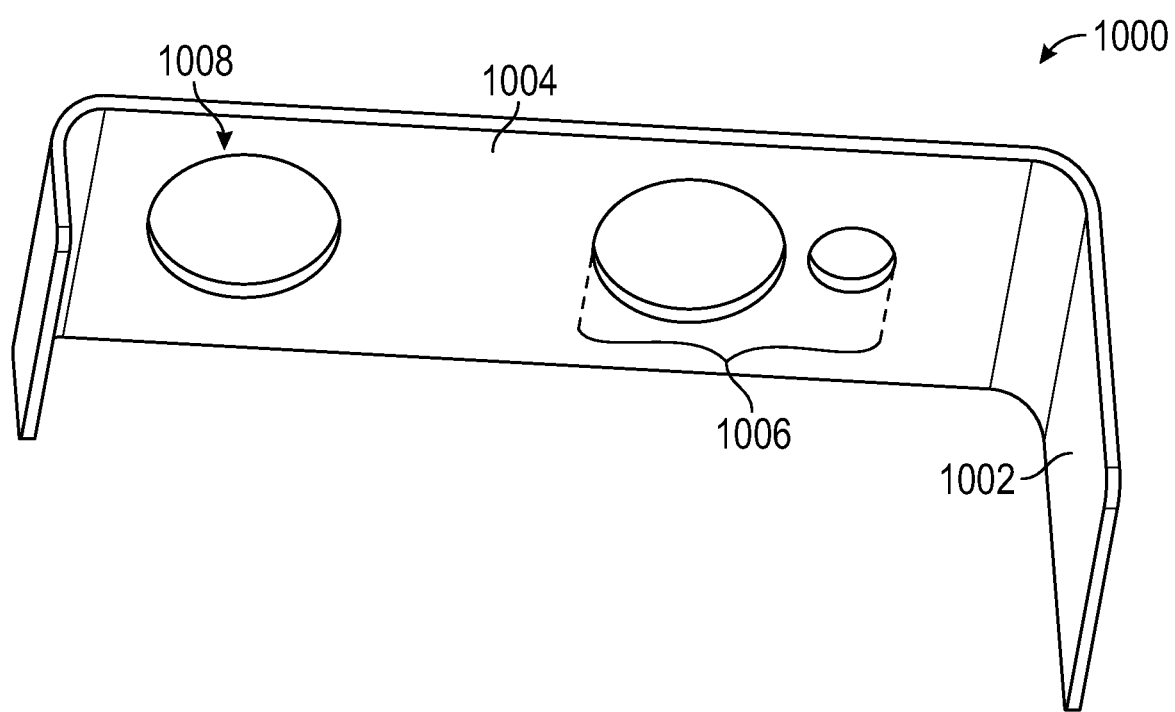
FIG. 10 is a perspective view of an exemplary side wall component according to an exemplary embodiment of the present disclosure.

With reference to FIG. 10, exemplary side wall component 1000 includes at least one side wall 1002 and base 1004 in a substantially "L" shaped configuration. Side wall component 1000 may further include cutout(s) for a PDD device 1006 and/or a vent/flame arrestor 1008, configured into base 1004. However, to ensure each side wall component 1000 is symmetrically identical during the initial manufacturing process, cutouts 1006, 1008 (and others) may be incorporated after the initial fabrication of side wall component 1000. In yet another embodiment, one or more cutouts 1006, 1008 may be fabricated into sidewall 1002.

To assemble side wall component 1000, one side wall component 1000 is rotated so as to ensure that each base 1004 interfaces with an edge of side wall 1002. A correctly fabricated clamshell configuration (not shown) using two side wall components 1000 will create a substantially rectangular configuration. However, additional configurations will be apparent to persons skilled in the art. The above-mentioned clamshell configurations may provide a cost-savings by substantially reducing manufacturing/assembly operations. For example, the disclosed clamshell components may be advantageously joined around one or more pre-assembled support members that contain electrochemical units, as disclosed herein. Thus, assembly is greatly facilitated by allowing the pre-assembly of the electrochemical units within support member(s) before associating the noted sub-assembly with an outer enclosure. Once the clamshell elements are positioned around the support member(s) and the seams are welded, an hermetic enclosure may be established in the same manner as non-clam shell assembly protocols, e.g., by combining the clamshell components with a base and lid to define a fully enclosed and hermetically sealed structure.

In an illustrious embodiment, the clamshell components are fabricated using plastic or ceramic materials, but may also be made of metal. If a metal is used, exposed steel is not preferred, and any steel container would need to be coated with an inert metal such as nickel. Preferred metals are aluminum, nickel or other inert metal to the chemicals used. A variety of plastics and ceramics may be used as long as they are inert to the chemical and electrochemical environment. Examples of plastics and ceramics are polypropylene, polyethylene, alumina, zirconia. In the case of metal components, welding methods, such as laser welding, may be used to seal the clamshell components. In the case of plastics, adhesives (glues), or thermal or ultrasonic weld methods may be used, or any combination thereof. Once assembled, this provides for a hermetically sealed modular enclosure 116, 616, 702. The clamshell components may also include a fire retardant mesh affixed to the exterior of the clamshell components for the purpose of preventing fire from reaching the interior of the enclosure/compartments.

Anode

The anode of these core members are those commonly found in Li-ion or Li polymer batteries and described in the literature, such as graphite, doped carbon, hard carbon, amorphous carbon, Silicon (such as silicon nano particles or Si pillars or dispersed silicon with carbon), tin, tin alloys, $Cu_6Sn_5$, Li, deposited Li onto metal foil substrates, Si with Li, mixed in Li metal powder in graphite, lithium titanate, and any mixtures thereof. Anode suppliers include, for example, Morgan Carbon, Hitachi Chemical, Nippon Carbon, BTR Energy, JFE Chemical, Shanshan, Taiwan Steel, Osaka Gas, Conoco, FMC Lithium, Mitsubishi Chemical. The disclosure is not limited to any particular anode compound.

Cathode

The cathode used for the jelly rolls are those that are standard for the industry and also some new high voltage mixtures, which are described in more detail below. These new cathodes can be used in MC structures or in single cell batteries wherein the anode/cathode structure is contained in a sealed metal canister or a sealed polymer bag. Due to the richness of cathode materials available to the industry, the classes of materials as to each materials group herein are referred to as "Compounds"; each compound can have a range of compositions and are grouped due to similarity in crystal structure, chemical composition, voltage range suitability, or materials composition and gradient changes. Examples of suitable individual materials are $Li_xCoO_2$ (referred to as Compound A), $Li_xM_zCo_wO_2$ (Compound B, where M is selected from Mg, Ti, and Al and partly substituting Co or Li in the crystal lattice and added in the range Z=0-5%, typically W is close to 1, suitable for charge above 4.2V), $Li_xNi_aMn_bCo_cO_2$ (in particular the combinations of about a=1/3, b=1/3, c=1/3 (Compound C) and a=0.5, b=0.3, c=0.2 (Compound D), and Mg substituted compounds thereof (both grouped under Compound E)).

Another example is $Li_xNi_dCo_eAl_fO_2$ (Compound F) and its Mg substituted derivative $Li_xMg_yNi_dCo_eAl_fO_2$ (Compound G), where in a special case d=0.8, e=0.15, f=0.05, but d, e, and f can vary with several percent, y ranges between 0 and 0.05. Yet another example of individual cathode materials are $Li_xFePO_4$ (Compound H), $Li_xCoPO_4$ (Compound I), $Li_xMnPO_4$ (Compound J), and $Li_xMn_2O_4$ (Compound K). In all of these compounds, an excess of lithium is typically found (x>1), but X can vary from about 0.9 to 1.1. A class of materials that is particularly suited for high voltages, possessing high capacity when charged above 4.2V, are the so-called layered-layered materials described for instance by Thackeray et al. in U.S. patent U.S. Pat. No. 7,358,009 and commercially available from BASF and TODA (Compound L).

The compound initially described by Thackeray can be made stable at voltages above 4.2V. Some of these cathodes are stable at high voltages, above 4.2V (the standard highest voltage using graphite as anode) and those materials can be preferably mixed. Although one of the above materials can be used in the disclosure, it is preferred to mix two or more of the materials compounds selected from B, C, D, E, F, G I, J, and L. In particular two or more component mixture of the Compounds B, D, F, G, and L is preferred. For very high energy density configurations a mixture of (B and L) or (B and G) or (G and L) are most beneficial and when these are made as thin electrodes also high power can be achieved. The thin (power) and thick (energy) electrodes can enter into core members for tailoring of energy to power ratio, while having same suitable voltage range and chemistry.

A particular new cathode, the so-called, core shell gradient (CSG) material (referred to as Compound M), has a different composition at its core compared to its shell. For instance Ecopro(website www.ecopro.co.kr or (http://ecopro.co.kr/xe/?mid=emenu31, as of date 2010-10-01) or Patent Application and registration PCT/KR2007/001729(PCT) (2007), which describes such a Compound M material in their product literature as "CSG material" (Core Shell Gradient) as $xLi[Ni_{0.8}Co_{0.1}Mn_{0.1}]O_2(1-x)Li[Ni_{0.46}Co_{0.23}Mn_{0.31}]O_2$ and another M-type compound is also described by Y-K Sun in ElectrochimicaActa Vol. 55 Issue 28 p. 8621-8627, and third description of M-type compound can be found by in Nature Materials 8 (2009) p. 320-324 (article by Y K Sun et al), which describes a CSG material of similar composition but formula Bulk=$Li(Ni_{0.8}Co_{0.1}Mn_{0.1}O_2$, gradient concentration=$Li(Ni_{0.8-x}Co_{0.1+y}Mn_{0.1+z}$, where $0 \le x \le 0.34$, $0' y \le 0.13$, and $0 \le z \le 0.21$; and surface layer=$Li(Ni_{0.46}Co_{0.23}Mn_{0.31})O_2$. A forth description can be found in patent WO2012/011785A2 (the "785A2" patent), describing the manufacturing of variants of Compound M described as $Li_{x1}[Ni_{1-y1-z1-w1}Co_{y1}Mn_{z1}M_{w1}]O_2$ (where, in the above formula, $0.9 \le x1 \le 1.3$, $0.1 \le y1 \le 0.3$, $0.0 \le z1 \le 0.3$, $0 \le w1 \le 0.1$, and M is at least one metal selected from Mg, Zn, Ca, Sr, Cu, Zr, P, Fe, Al, Ga, In, Cr, Ge, and Sn); and an exterior portion including the compound of $Li_{x2}[Ni_{1-y2-z2-w2}Co_{y2}Mn_{z2}M_{w2}]O_2$ (where, in the exterior formula, $0.9 \le x2 \le 1+z2$, $0 \le y2 \le 0.33$, $0 \le z2 \le 0.5$, $0 \le w2 \le 0.1$ and M is at least one metal selected from Mg, Zn, Ca, Sr, Cu, Zr, P, Fe, Al, Ga, In, Cr, Ge, and Sn). All four ranges of variants of compound M are incorporated herein as reference for Compound M to be used in various aspects of the disclosure.

It is preferred that the M compound may further have Li content that could be at about 1, but vary within a few percent and that the Li or Ni/Mn/Co compounds can be substituted with Mg, Al and first row transition metals, by optimization, and that it is preferred to blend one or more of these M compounds as described above with Compounds B, C, D, E, F, G, L for use in Li-ion batteries. It is likely that the core Compound M material can contain up to 90% nickel and as low as 5% Cobalt and up to 40% Mn, and the gradient would then go from one of these boundary compositions to as low as 10% Ni, 90% Cobalt, and 50% Mn.

In general, high power can be achieved by using thin electrodes of the compounds or blends described within this disclosure for anode and cathodes. A thick electrode is typically considered to be above 60 μm of thickness up to about 200 μm, when measuring the electrode coating layer thickness from the aluminum foil, while thinner electrodes (i.e. less than 60 μm) are better for high power Li-ion battery configurations. Typically for high power, more carbon black additive is used in the electrode formulations to make it more electrically conductive. Cathode compounds can be bought from several materials suppliers, such as Umicore, BASF, TODA Kogyo, Ecopro, Nichia, MGL, Shanshan, and Mitsubishi Chemical. Compound M, is available from Ecopro and described in their product literature as CSG material (such as $xLi[Ni_{0.8}Co_{0.1}Mn_{0.1}]O_2(1-x)Li[Ni_{0.46}Co_{0.23}Mn_{0.31}]O_2$ and another M-type compound also as described by Y-K Sun in ElectrochimicaActa Vol. 55

Issue 28 p. 8621-8627, all of which can preferably be blended with compounds as described above.

The compounds A-M blended as two or more compounds into high voltage cathodes can preferably be coated with a surface modifier. When a surface modifier is used, it is preferred, although not necessary, that each compound is coated with the same surface modifier. The surface modifier helps increase first cycle efficiency of the cathode mixture and rate capability. Also, useful life is improved with applying the surface modifying material. Examples of surface modifiers are $Al_2O_3$, $Nb_2O_5$, $ZrO_2$, $ZnO$, $MgO$, $TiO_2$, metal fluorides such as $AlF_3$, metal phosphates $AlPO_4$ and $CoPO_4$. Such surface modifying compounds have been described in the literature earlier[J. Liu et al, J. of Materials Chemistry 20 (2010) 3961-3967; S T Myung et al., Chemistry of Materials 17 (2005) 3695-3704; S. T. Myung et al., J. of Physical Chemistry C 11 1 (2007) 4061-4067; ST Myung et al., J. of Physical Chemistry C 1 154 (2010) 4710-4718; BC Park et al, J. of Power Sources 178 (2008) 826-831; J. Cho et al., J of Electrochemical Society 151 (2004) A1707-A1711], but never reported in conjunction with blended cathodes at voltages above 4.2V. In particular it is beneficial to blend surface modified compounds B, C, D, E, F, G, L and M for operation above 4.2V.

The cathode material is mixed with a binder and carbon black, such as ketjen black, or other conductive additives. NMP is typically used to dissolve the binder and PVDF is a preferred binder for Li-ion, while Li polymer type can have other binders. The cathode slurry is mixed to stable viscosity and is well known in the art. Compounds A-M and their blends described above are herein sometimes referred collectively as "cathode active materials". Similarly anode compounds are referred to as anode active materials.

A cathode electrode can be fabricated by mixing for instance a cathode compound, such as the blends or individual compounds of Compound A-M above, at about 94% cathode active materials and about 2% carbon black and 3% PVDF binder. Carbon black can be Ketjen black, Super P, acetylene black, and other conductive additives available from multiple suppliers including AkzoNobel, Timcal, and Cabot. A slurry is created by mixing these components with NMP solvent and the slurry is then coated onto both sides of an Aluminum foil of about 20 micrometer thickness and dried at about 100-130° C. at desired thickness and area weight. This electrode is then calendared, by rolls, to desired thickness and density.

The anode is prepared similarly, but about 94-96% anode active material, in case of graphite, is typically used, while PVDF binder is at 4%. Sometimes SBR binder is used for cathode mixed with CMC and for that type of binder higher relative amounts of anode active materials at about 98% can typically be used. For anode, carbon black can sometimes be used to increase rate capability. Anode is coated on copper foil of about 10 micrometer.

Those skilled in the art would easily be able to mix compositions as described above for functional electrodes.

To limit electrode expansion during charge and discharge fiber materials of PE, PP, and carbon can optionally be added to the electrode formulation. Other expansion techniques use inert ceramic particulates such as $SiO_2$, $TiO_2$, $ZrO_2$ or $Al_2O_3$ in the electrode formulation. Generally the density of cathodes is between 3 and 4 $g/cm^3$, preferably between 3.6 and 3.8 $g/cm^3$ and graphite anodes between 1.4 and 1.9 $g/cm^3$, preferably 1.6-1.8 $g/cm^3$, which is achieved by the pressing.

Separator

The separator needs to be an electrically insulating film that is inserted between anode and cathode electrodes and should have high permeability for Li ions as well as high strength in tensile and transverse direction and high penetration strength. The pore size is typically between 0.01 and 1 micrometer and thickness is between 5 micrometer and 50 micrometer. Sheets of non-woven polyolefins, such as polyethylene (PE), polypropylene (PP) or PP/PE/PP structures are typically used. A ceramic, typically consisting of $Al_2O_3$, may be applied onto the film to improve shrinking upon heating and improve protection against internal shorts. Also the cathode or the anode can be coated similarly with a ceramic. Separators can be procured from multiple suppliers in the industry including Celgard, SK, Ube, Asahi Kasei, Tonen/Exxon, and WScope.

Electrolyte

The electrolyte is typically found in the industry containing solvents and salts. Solvents are typically selected between DEC (diethyl carbonate), EC (ethylene carbonate), EMC (ethyl methyl carbonate), PC (propylene carbonate), DMC (dimethyl carbonate), 1,3dioxolane, EA (ethyl acetate), tetrahydrofuran (THF). Salts are selected between $LiPF_6$, $LiClO_4$, $LiAsF_6$, $LiBF_4$, sulfur or imide containing compounds used in electrolyte includes $LiCFSO_3$, $LiN(CF_3SO_2)_2$, $LiN(CF_3CF_2SO_2)_2$, or a plain sulfonation by bubbling $SO_2$ through a premixed electrolyte such as EC/EMC/DMC (1:1:1 ratio) and 1M $LiPF_6$. Other salts are LiBOB (Lithium Bis-oxalateborate), TEATFB (tetraethylammoniumtetrafluoroborate), $TEMABF_4$ (triethylmethylammoniumtetrafluoroborate). Additive for effective SEI formation, gas generation, flame retardant properties, or redox shuttling capability can also be used, including BP (biphenyl), FEC, pyridine, triethylphosphite, triethanolamine, ethylenediamine, hexaphosphorictriamide, sulfur, PS (propylenesulfite), ES (ethylenesulfite), TPP (triphenylphosphate), ammonium salts, halogen containing solvents, such as carbon tetrachloride or ethylene trifluoride and additionally CO2 gas to improve high temperature storage characteristics. For solid/gel or polymer electrolytes PVDF, PVDF-HFP, EMITFSI, LiTFSI, PEO, PAN, PMMA, PVC, any blends of these polymers, can be used along with other electrolyte components to provide a gel electrolyte. Electrolyte suppliers include Cheil, Ube, Mitsubishi Chemical, BASF, Tomiyama, Guotsa-Huasong, and Novolyte.

There are electrolytes that work for both supercapacitors (those having electrochemical doublelayers) and standard Li-ion batteries. For those electrolytes one or more supercapacitor cores can be mixed with one or more regular Li-ion core member in an enclosure, so that the supercapacitor component works as a power agent and the Li-ion core member as an energy harvesting agent.

EXAMPLE

In this example a set of 5 jelly roll type core members of cylindrical shape that are connected in parallel to two common bus bars (positive and negative), like the MC battery configuration shown in FIG. 1, but with only half as many core members. The negative connector is connected to the tabs extending from the jelly roll's anode foil (copper), has a coated graphite electrode, and the positive connector to the jelly roll's cathode foil (aluminum) has a blended oxide electrode structure of Compound M and Compound F. The anode tab made out of nickel and the cathode tab made of aluminum is welded to the bus bar using spot welding or laser welding techniques. The enclosure and support member are made of plastic material (polyethylene). For this example, cylindrical cavities with an 18 mm diameter and the jelly roll core members with a slightly smaller diameter (17.9 mm) were used. The enclosure and lid are made of plastic material that is ultrasonically welded together and thereby creating a hermetic seal.

One skilled in the art can select and vary the property of the core members, as described above, achieve high energy or high power cores. The table shown below outlines three examples, with varying core compositions of the 5 core member example described above and the different properties of the MC battery that can be achieved.

| CORE | EXAMPLE 1 | EXAMPLE 2 | EXAMPLE 3 |
|---|---|---|---|
| 1 | 3 Ah, energy core M cathode | 1.5 Ah, power core D cathode | 2.5 Ah, power core (0.8 F/0.2 D) cathode mix |
| 2 | 3 Ah, energy core M cathode | 3.0 Ah, power core D cathode | 3.0 Ah, power core M cathode |
| 3 | 3 Ah, energy core M cathode | 3.0 Ah, power core D cathode | 3.0 Ah, power core M cathode |
| 4 | 3 Ah, energy core M cathode | 3.0 Ah, power core D cathode | 3.0 Ah, power core M cathode |
| 5 | 3 Ah, energy core M cathode | 1.5 Ah, power core D cathode | 3.0 Ah, power core M cathode |
| SUMMARY | IDENTICAL PROPERTIES ON ALL CORES | MIXED POWER AND ENERGY CORES, MIXED CAPACITY, SAME VOLTAGE | MIXED POWER AND ENERGY CORES, MIXED CAPACITY, MIXED VOLTAGE |

The disclosure may be embodied in other specific forms without departing from the spirit or essential characteristics thereof. The present embodiments are therefore to be considered in respects as illustrative and not restrictive.

The invention claimed is:

1. A lithium ion battery, comprising:
at least two support members, each of the at least two support members including a plurality of cavities defined by cavity surfaces, wherein each of the plurality of cavities is configured to receive a lithium ion core member through a cavity opening;
a plurality of lithium ion core members, each of the plurality of lithium ion core members (i) including an anode, a cathode, a separator positioned between the anode and the cathode, and electrolyte, and (ii) positioned in one of the plurality of cavities of the support member, and
a hermetically sealed enclosure that (i) defines or includes a shared wall positioned between two of the at least two support members to define two compartmentalized regions, and (ii) defines a first shared atmosphere region within a first of the two compartmentalized regions and a second shared atmosphere region with a second of the two compartmentalized regions;
wherein each of the lithium ion core members is surrounded by a cavity surface of one of the plurality of cavities along its length such that electrolyte is prevented from escaping the cavity within which it is contained; and
wherein the anode, cathode and electrolyte of each ion core member communicates with the first shared atmosphere region or the second shared atmosphere region through a cavity opening when positioned in a cavity of the at least two support members.

2. The lithium ion battery of claim 1, wherein the first shared atmosphere region is in communication with the second shared atmosphere region despite the shared wall.

3. The lithium ion battery of claim 1, wherein the shared wall prevents communication between the first shared atmosphere region and the second shared atmosphere region.

4. The lithium ion battery of claim 1, wherein the enclosure includes at least one pressure disconnect feature.

5. The lithium ion battery of claim 1, wherein each compartmentalized region includes at least one pressure disconnect feature.

6. The lithium ion battery of claim 1, further comprising at least one structure for controlling gas or fluid flow from one or more of the lithium ion core members.

7. The lithium ion battery of claim 6, wherein the at least one structure is a blanket in contact with or in close proximity to one or more of the lithium ion core members.

8. The lithium ion battery of claim 6, wherein the at least one structure is fabricated from a ceramic material that is configured and dimensioned to promote axial flow through the structure and to substantially prevent lateral flow therethrough.

9. The lithium ion battery of claim 1, wherein the shared wall is a partial wall that extends only a portion of a distance between a base and top of the enclosure, or a full wall that extends from the base to the top of the enclosure.

10. The lithium ion battery of claim 1, wherein the at least two support members include a kinetic energy absorbing material.

11. The lithium ion battery of claim 1, further comprising a cavity liner positioned in each cavity, wherein each of the cavity liners is formed of a plastic or aluminum material and receives one of the lithium ion core members.

12. The lithium ion battery of claim 1, further including an electrical connector within said hermetically sealed enclosure electrically connecting said ion core members to an electrical terminal external to the hermetically sealed enclosure.

13. The lithium ion battery of claim 1, wherein at least one of the at least two support members is in the form of a honeycomb structure.

14. The lithium ion battery of claim 1, wherein the hermetically sealed enclosure includes a wall having a compressible element which when compressed due to a force impacting the wall creates an electrical short circuit of the lithium ion battery.

15. The lithium ion battery of claim 1, wherein the hermetically sealed enclosure includes a fire retardant member.

16. The lithium ion battery of claim 15, wherein the fire retardant member comprises a fire retardant mesh material affixed to the exterior of the hermetically sealed enclosure.

17. The lithium ion battery of claim 15, wherein the fire retardant member is selected from the group consisting of a polyurethane foam, an epoxy foam, and glass fiber wool.

18. The lithium ion battery of claim 1, further including a protective sleeve surrounding each of the ion core members.

19. The lithium ion battery of claim 1, wherein the electrolyte comprises at least one of a flame retardant, a gas generating agent, and a redox shuttle.

20. The lithium ion battery of claim 1, wherein at least two of the lithium ion core members are connected in parallel.

21. The lithium ion battery of claim 1, wherein at least two of the lithium ion core members are connected in series.

22. The lithium ion battery of claim 1, wherein a first set of lithium ion core members are connected in parallel, a second set of lithium ion core members are connected in parallel, and the first set of lithium ion core members and the second set of lithium ion core members are connected in series.

23. The lithium ion battery of claim 1, wherein electrical connection of the lithium ion core members is selected from the group consisting of: (i) parallel connection of the lithium ion core members, (ii) series connection of the lithium ion core members, and (iii) parallel connection of a first set of lithium ion core members, parallel connection of a second set of lithium ion core members, and series connection of the first set of lithium ion core members and the second set of lithium ion core members.

24. The lithium ion battery of claim 1, wherein the hermetically sealed enclosure defines or includes a plurality of shared walls, and wherein the hermetically sealed enclosure defines compartmentalized regions on either side of each of the plurality of shared walls.

* * * * *